US007269330B1

(12) United States Patent
Iggulden

(10) Patent No.: US 7,269,330 B1
(45) Date of Patent: *Sep. 11, 2007

(54) METHOD AND APPARATUS FOR CONTROLLING A VIDEO RECORDER/PLAYER TO SELECTIVELY ALTER A VIDEO SIGNAL

(75) Inventor: Jerry Iggulden, Los Angeles, CA (US)

(73) Assignee: TeleVentions, LLC, Los Angeles, CA (US)

( * ) Notice: Subject to any disclaimer, the term of this patent is extended or adjusted under 35 U.S.C. 154(b) by 1091 days.

This patent is subject to a terminal disclaimer.

(21) Appl. No.: 10/167,008

(22) Filed: Jun. 10, 2002

Related U.S. Application Data

(63) Continuation-in-part of application No. 09/452,055, filed on Nov. 30, 1999, now Pat. No. 6,404,977, which is a continuation of application No. 08/742,312, filed on Nov. 1, 1996, now Pat. No. 5,999,689.

(51) Int. Cl.
*H04N 7/00* (2006.01)
*H04N 11/00* (2006.01)
*H04N 5/14* (2006.01)
*H04N 9/64* (2006.01)

(52) U.S. Cl. .................. 386/46; 348/460; 348/700; 358/908

(58) Field of Classification Search ............ 386/46, 386/94; 348/460, 907, 4, 700, 571; 358/908; 360/5
See application file for complete search history.

(56) References Cited

U.S. PATENT DOCUMENTS

| 3,919,479 | A | 11/1975 | Moon |
| 4,229,765 | A | 10/1980 | Sanger |
| 4,230,765 | A | 10/1980 | Takahashi et al. |
| 4,230,990 | A | 10/1980 | Lert, Jr. |
| 4,259,689 | A | 3/1981 | Bonner |
| 4,333,110 | A | 6/1982 | Faerber |
| 4,390,904 | A | 6/1983 | Johnston |
| 4,420,769 | A | 12/1983 | Novak |

(Continued)

FOREIGN PATENT DOCUMENTS

DE 44 42 264 5/1996

(Continued)

*Primary Examiner*—Thai Q. Tran
*Assistant Examiner*—Nigar Chowdhury
(74) *Attorney, Agent, or Firm*—Blakely, Sokoloff, Taylor & Zafman, LLP

(57) ABSTRACT

The method and apparatus operates in a video recorder and playback unit to identify selected broadcast segments, such as commercial advertisements, of a television signal in real-time for the purpose of either suspending recording or advancing playback of the television signal during each unwanted segment. A signature pattern associated with each segment of the television signal is detected and compared to stored signature patterns representative of selected segments such as commercial advertisement segments. If the signature pattern matches one of the stored signature patterns, the segment is thereby immediately identified as being one of the selected segments and is processed in real-time to control operation of the video recorder/player. If the signature pattern of the segment does not match any of the stored signature patterns, the segment is analyzed to determine whether the segment is nevertheless a selected segment and, if so, its signature pattern is stored along with the stored signature patterns.

5 Claims, 16 Drawing Sheets

U.S. PATENT DOCUMENTS

| | | |
|---|---|---|
| 4,602,297 A | 7/1986 | Reese |
| 4,677,466 A | 6/1987 | Lert, Jr. |
| 4,697,209 A | 9/1987 | Kiewit |
| 4,739,398 A | 4/1988 | Thomas |
| 4,750,052 A | 6/1988 | Poppy |
| 4,750,213 A | 6/1988 | Novak |
| 4,752,834 A | 6/1988 | Koombes |
| 4,782,401 A | 11/1988 | Faerber |
| 4,979,047 A | 12/1990 | Wine |
| 5,019,899 A | 5/1991 | Boles |
| 5,151,788 A | 9/1992 | Blum |
| 5,333,091 A | 7/1994 | Iggulden |
| 5,343,251 A | 8/1994 | Nafeh |
| 5,436,653 A | 7/1995 | Ellis |
| 5,455,630 A | 10/1995 | McFarland |
| 5,481,296 A | 1/1996 | Cragun et al. |
| 5,488,425 A | 1/1996 | Grimes |
| 5,504,518 A | 4/1996 | Ellis |
| 5,635,989 A | 6/1997 | Rothmuller |
| 5,659,366 A | 8/1997 | Kerman |
| 5,668,917 A | 9/1997 | Lewine |
| 5,708,477 A | 1/1998 | Forbes et al. |
| 5,748,263 A | 5/1998 | Ball |
| 5,973,723 A | 10/1999 | DeLuca |
| 5,999,689 A | 12/1999 | Iggulden |

FOREIGN PATENT DOCUMENTS

| | | |
|---|---|---|
| EP | 0 210 609 | 2/1987 |
| EP | 0 161 512 | 7/1989 |
| EP | 0 618 726 A1 | 3/1993 |
| EP | 0 574 698 A1 | 12/1993 |
| JP | 1-174192 | 7/1989 |
| WO | WO94/16422 | 7/1994 |
| WO | WO96/08921 | 3/1996 |

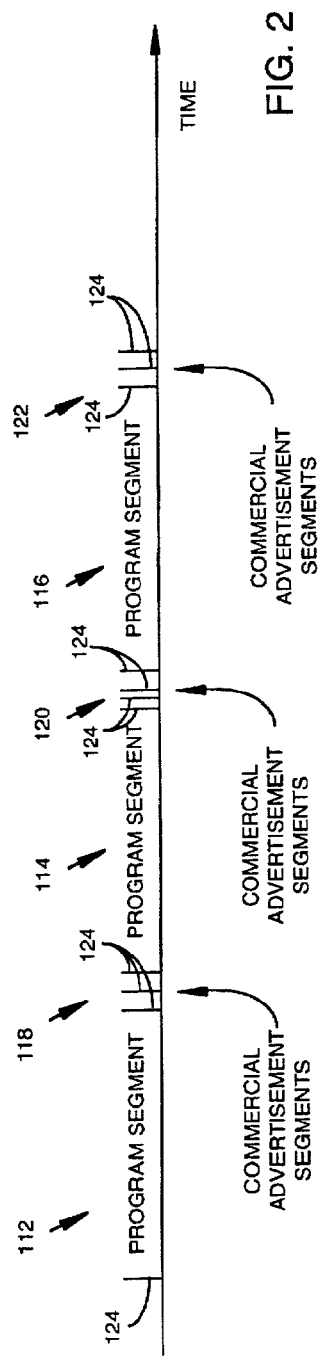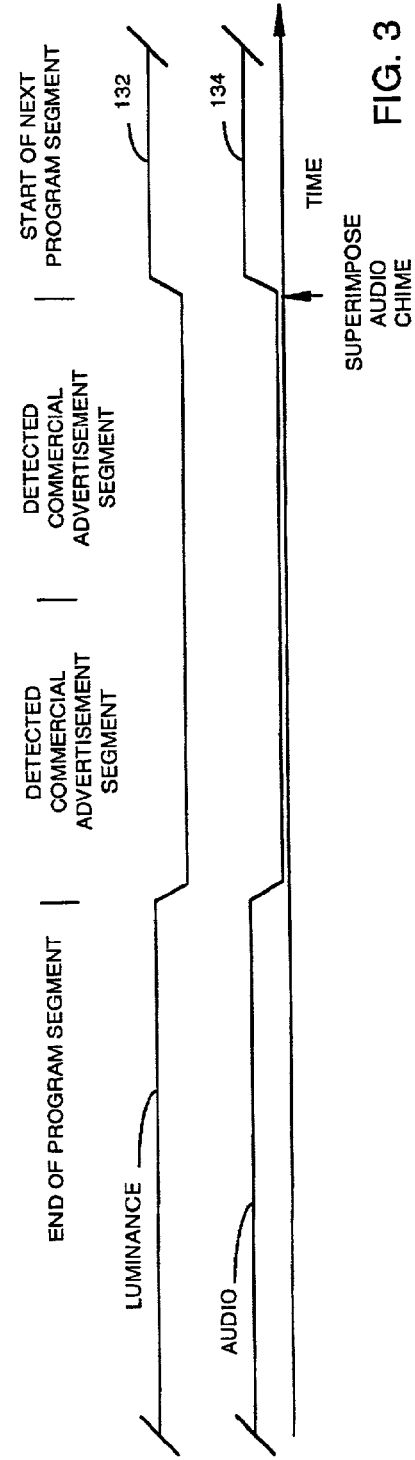

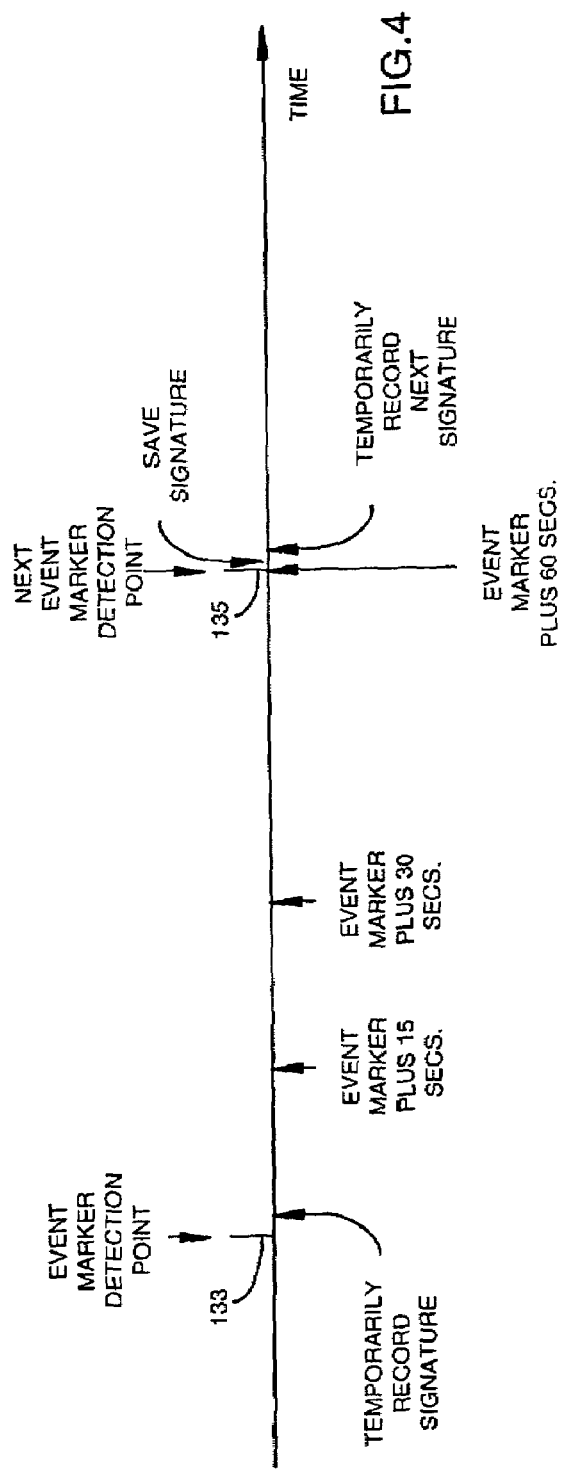
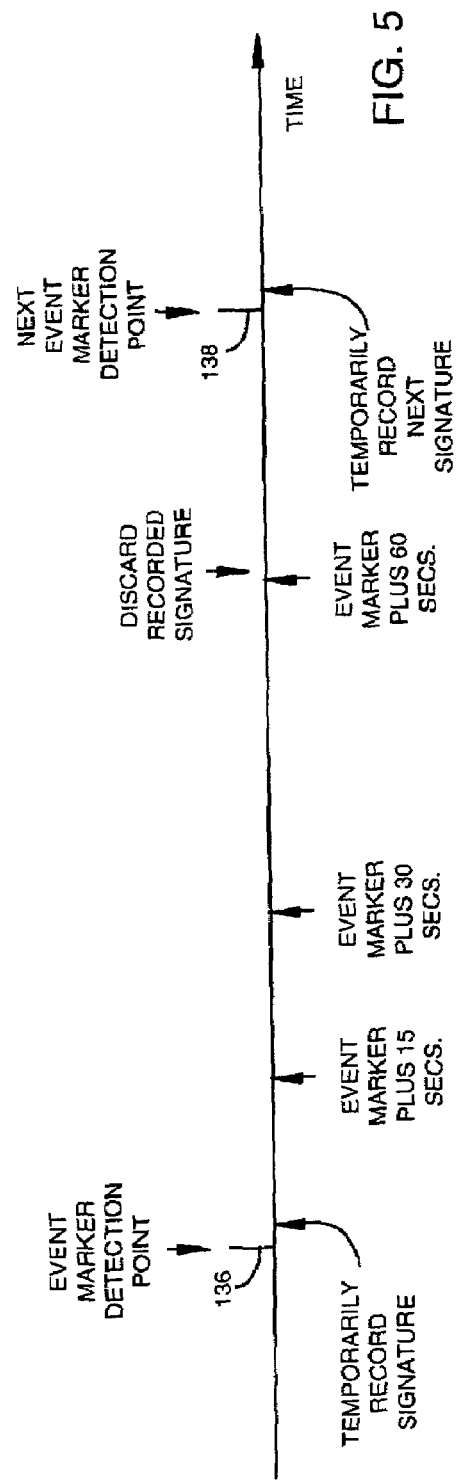

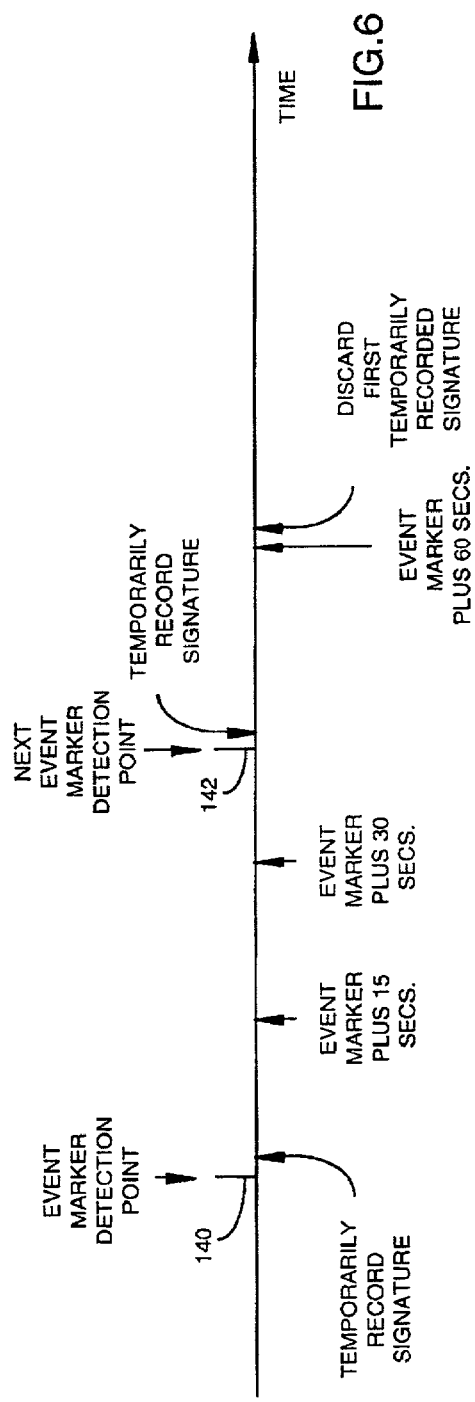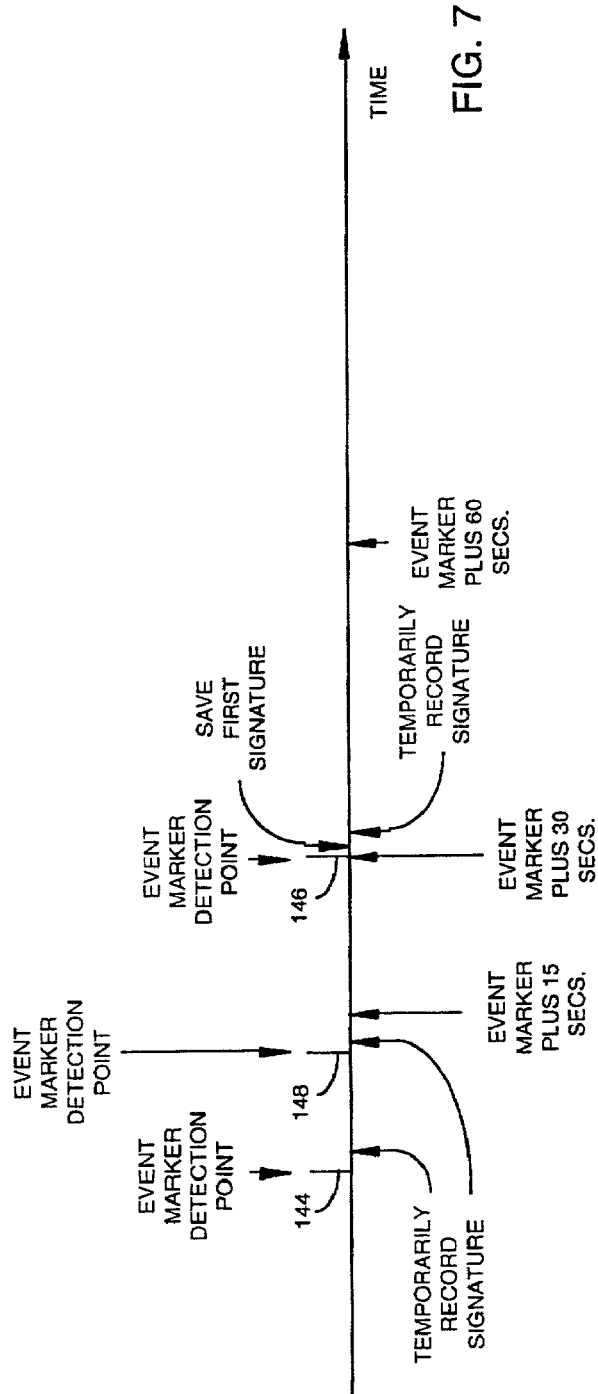

METHOD AND APPARATUS FOR CONTROLLING A VIDEO RECORDER/PLAYER TO SELECTIVELY ALTER A VIDEO SIGNAL

RELATED APPLICATION

This is a continuation-in-part of application Ser. No. 09/452,055 filed Nov. 30, 1999, now U.S. Pat. No. 6,404,977, which is a continuation of application Ser. No. 08/742,312 filed Nov. 1, 1996, now U.S. Pat. No. 5,999,689.

BACKGROUND OF THE INVENTION

1. Field of the Invention

The invention relates to television signal processing systems and in particular to television signal processing systems for detecting selected segments of a television signal such as commercial advertisement segments.

2. Description of Related Art

It has long been a desire of many television viewers to have a system which automatically detects selected segments of a television signal such as commercial advertisements or other unwanted broadcast segments in real-time during a television broadcast for the purposes of, for example, muting the audio portion of the television broadcast during the unwanted broadcast material or controlling a video recorder to skip the unwanted broadcast material during recording or playback of the television broadcast. Although a wide variety of techniques have been developed for detecting selected segments of television signals, heretofore there have been no sufficiently effective and economical systems that automatically operate in real-time for muting the television signal during the selected segments, for controlling a video recorder to skip selected segments, or for similar purposes.

Examples of broadcast segment detection systems include systems for detecting commercial advertisements during the playback of a television program on a video cassette recorder (VCR) for the purpose of controlling the VCR to skip or scan over the commercial advertisements during playback such that a viewer may watch the recorded television program without significant commercial advertisement interruptions. One particularly effective system is described in U.S. Pat. No. 5,333,091 entitled "Method and Apparatus for Controlling a Videotape Player to Automatically Scan Past Recorded Commercial Messages" and sold under the trademark "Commercial Advance." With the system of U.S. Pat. No. 5,333,091, an automatic editing device is coupled between a conventional VCR and a conventional television set. As a broadcast program is recorded on a videotape by the VCR, the editing device detects and records the timing and duration of selected events, such as black frames combined with low audio, that separate segments of the broadcast and creates a time-based map of the selected events. After the recording is completed, the editing device analyzes the time-based map and determines therefrom which segments are commercial advertisement segments and which are program segments. The editing device then records control signals on the videotape prior to and following the commercial advertisement segments. Upon playback, the control signals control the VCR to fast-scan over the commercial advertisement segments so that the recorded broadcast can be viewed substantially without interruption. Related techniques are described in U.S. Pat. No. 5,455,630 and in PCT application PCT/US94/00223 published as WO 94/16442.

Although the systems of U.S. Pat. Nos. 5,333,091 and 5,455,630 and PCT application PCT/US94/00223 are very effective in skipping over commercial advertisements and other unwanted broadcast material during the playback of a recorded broadcast program on a videotape, the systems do not operate in real-time during a received broadcast.

Other examples of broadcast segment detection systems include systems for detecting commercial advertisements during the recording of a television program on a VCR for the purposes of controlling the VCR to skip the commercial advertisements during recording such that a viewer may later watch the recorded television program without any commercial advertisement interruptions whatsoever. An example is a system described in U.S. Pat. No. 4,602,297 entitled "System for Editing Commercial Messages from Recorded Television Broadcasts" which stores and delays the output of a received broadcast signal to a VCR until it can determine whether the delayed portion of the broadcast signal includes commercial advertisements. To this end, the system detects commercial advertisements or groups of commercial advertisements within the delayed portion by detecting amplitude drops in the broadcast signal and determining whether time intervals between the amplitude drops correspond to normal durations of commercial advertisements or groups of commercial advertisements. The system then outputs only those portions of the delayed signal to the VCR that do not correspond to commercial advertisements of groups of commercial advertisements. Hence, the broadcast signal is recorded without commercial advertisements for future playback. However, the system does not operate in real-time to detect commercial advertisements within a received broadcast signal. Rather the system instead requires that the received broadcast signal be temporarily stored and delayed. Commercial advertisements may each be one minute or perhaps more in length thereby requiring a significant amount of storage for temporarily storing portions of the broadcast signal and thereby requiring a system which is not sufficiently economical for most purposes.

Other examples of systems for detecting commercial advertisements during the recording of a television program are described in U.S. Pat. No. 4,750,052 entitled "Apparatus and Method for Automatically Deleting Selected Program Intervals from Recorded Television Broadcasts" and U.S. Pat. No. 4,782,401 entitled "Editing Method and Apparatus for Commercials During Video Recording", both of which also operate to detect commercial advertisements based upon intervals occurring between amplitude drops or other fades in a received broadcast signal. Rather than storing and deleting the received signals prior to output to a VCR, however, the systems of U.S. Pat. Nos. 4,750,052 and 4,782,401 record the signals on a videotape using a VCR and control the VCR to rewind at the end of each commercial advertisement or group of advertisements such that further program signals are recorded over the commercial advertisements. As with the previously described system, the systems of U.S. Pat. Nos. 4,750,052 and 4,782,401 do not operate in real-time and are not sufficiently economical for most purposes.

Moreover, none of the aforementioned systems for detecting broadcast segments during the recording of a television program operate in real-time for the purpose of, for example, muting the audio during commercial advertisements or other broadcast segments.

Still other examples of broadcast segment detection systems include systems for detecting commercial advertisements in broadcast television signals for the purposes of verifying that selected commercial advertisements are being broadcast on the proper days and at the proper times. Examples include U.S. Pat. No. 5,504,518 entitled "Method and System for Recognition of Broadcast Segments" wherein stored digitized segments of broadcast signals are processed by an expert system to determine whether any particular segment corresponds to a selected segment of interest, such as a selected commercial advertisement. Segments that cannot be identified by the expert system, such as new or otherwise unknown segments, are routed to a human operator for verifying that the segment represents a commercial advertisement rather than a portion of a television program. Selected segment information such as the date and time of broadcast of the segments of interest are recorded and tabulated in a report for use by, for example, broadcast advertisers for verifying that the selected segments were broadcast on the proper dates and at the proper times. As part of its analysis of the segments, the expert system compares broadcast signatures with a database of signatures. A variety of techniques are described for defining and detecting signatures. The expert system also considers various cues including the lengths and relative groupings of segments and the intervals there between. No real-time analysis appears to be performed by the expert system or by the human operator.

Another system for commercial advertisement broadcast verification is described in Japanese Laid-Open Patent Application No. 1-174192, of Sony Corporation, entitled "Television Signal Processing Unit" wherein an entire days worth of broadcast programs are recorded on videotape. The recorded broadcasts are analyzed to identify commercial advertisement segments by intervals therebetween as detected by luminance signal considerations. The commercial advertisements, and only the commercial advertisements, are then output and recorded on a second videotape. The second videotape thereby contains a day's worth of commercial advertisements in extracted form that may be viewed by a human operator for broadcast verification purposes. Again, no real-time detection of commercial advertisements is performed.

Examples of systems for detecting broadcast segments, such as commercial advertisement segments, which have some real-time detection capability include U.S. Pat. No. 4,420,769 entitled "Device for the Automatic Editing, at the Receiver, of Unwanted Program Material from Broadcast Electrical Signals" and U.S. Pat. No. 4,750,213 entitled "Method and System for Editing Unwanted Program Material from Broadcast Signals". U.S. Pat. No. 4,420,769 describes a system wherein a human operator identifies program segments to be eliminated from a broadcast signal causing a digital code word or signature for the segment to be stored in memory. Subsequently, if the same segment is encountered, the system automatically compares digitized portions of the received signal with the stored signatures to recognize the segment and then to blank out or otherwise eliminate the segment in real-time. One significant problem with this system is that a human operator must first detect program segments to be eliminated. Also, a significant amount of data processing is required to establish and compare the signatures in a reliable manner. U.S. Pat. No. 4,750,213, by the same inventor, sets forth improvements intended, in part, to reduce the processing time required. The system of U.S. Pat. No. 4,750,213 also includes a delay or other storage device for allowing a received signal to be delayed until a determination can be made by the human operator as to whether a particular segment of the received signal should be eliminated. If so, the received, delayed signal is output with the selected segment blanked out or otherwise eliminated. Although U.S. Pat. No. 4,750,213 may represent an improvement over U.S. Pat. No. 4,420,769, it shares the disadvantage that a human operator must detect program segments to be eliminated.

Another example of a system which has some real-time detection capability is U.S. Pat. No. 5,151,788 entitled "Method and Apparatus for Identifying and Eliminating Specific Material from Video Signals" wherein commercial advertisement broadcast segments are distinguished from program segments by the relative level of "activity" within the beginning of each segment. If the activity level is high, the segment is presumed to be a commercial advertisement. The system detects the amount of activity within the first few seconds of a segment following a blank frame and operates to mute or otherwise eliminate the remaining portions of the segment if the detected activity level is representative of a commercial advertisement. The system may control a VCR to stop recording for the remainder of the segment. The patent describes that the optimum time period during which the activity level should be detected is 8 seconds. One disadvantage of the system is that the detection of commercial advertisements based upon an activity level is likely to be unreliable for many broadcasts and, even when the system does correctly detect a commercial advertisement, that detection does not occur until 8 seconds into the commercial advertisement.

Other references that relate to systems for detecting selected segments of a broadcast signal such as commercial advertisement segments of a television signal are described in the following references: U.S. Pat. No. 3,919,479 entitled "Broadcast Signal Identification System"; U.S. Pat. No. 4,229,765 entitled "Remote Audio and Brightness Control System for a Television"; U.S. Pat. No. 4,230,990 entitled "Broadcast Program Identification Method and System"; U.S. Pat. No. 4,259,689 entitled "Television Advertising Editing System"; U.S. Pat. No. 4,333,110 entitled "Television Editing System"; U.S. Pat. No. 4,390,904 entitled "Automatic Circuit and Method for Editing Commercial Messages from Television Signals"; U.S. Pat. No. 4,667,466 entitled "Broadcast Program Identification Method and Apparatus"; U.S. Pat. No. 4,697,209 entitled "Methods and Apparatus for Automatically Identifying Programs Viewed or Recorded"; U.S. Pat. No. 4,739,398 entitled "Method, Apparatus and System for Recognizing Broadcast Segments"; U.S. Pat. No. 4,752,834 entitled "Reciprocating Recording Method and Apparatus for Controlling a Video Recorder so as to Edit Commercial Messages from a Recorded Television Signal"; U.S. Pat. No. 5,019,899 entitled "Electronic Data Encoding and Recognition System" and European Patent Application Publication No. 0161512 entitled "Program Identification System".

Hence various techniques have been developed for detecting selected broadcast segments such as commercial advertisements within a television signal. None of the techniques described above, however, are effective for reliably and automatically detecting broadcast segments in real-time without the need of a human operator. Accordingly, it would be desirable to provide a simple, inexpensive system which reliably detects selected segments of a broadcast signal without requiring a human operator and wherein, either immediately or after some period of time, all or most selected segments can be detected in real-time.

SUMMARY OF THE INVENTION

In accordance with the invention, a method and apparatus is provided for use with a video recording and playback device to identify selected segments of a television broadcast signal in real-time. The selected segments, once identified, can be processed in accordance with a wide variety of applications. In one such application, wherein the identification of selected segments is provided for use in controlling the video recording and playback device to skip the selected segments during playback of a previously recorded broadcast. Hereinafter "selected segment" refers to any selected portion of a broadcast signal including, for example, unwanted broadcast segments such as commercial advertisement segments. In one embodiment, the method includes the steps of detecting a signature pattern associated with the beginning of a recorded segment of the television signal and comparing the signature pattern to stored signature patterns representative of selected segments. If the signature pattern matches one of the stored signature patterns, the recorded segment is thereby immediately identified as being one of the selected segments and the recorded segment is skipped during playback. The method may be performed by a VCR, digital video recorder (DVR), or any other device for receiving, recording and playing back a television signal.

If the signature pattern of the recorded segment does not match any of the stored signature patterns, the recorded segment may be analyzed to determine whether it is nevertheless one of the selected segments and, if so, its signature pattern is stored along with the stored signature patterns. The analysis to determine whether the received segment is one of the selected segments even though its signature does not match any of the stored signatures may be performed by, for example, detecting the length of the received segment upon its completion and then determining whether the length of the received segment matches any of a pre-determined set of permissible lengths for selected segments. If so, the segment is identified as being a selected segment and its signature pattern is stored along with the other stored signature patterns such that, the next time the same segment is received, its signature will then match one of the stored signatures and therefore the received segment will be identified promptly as a selected segment. A segment may also be manually designated as a selected segment, which likewise results in the corresponding signature being stored.

In one implementation, no stored signatures are initially provided. Hence, the first time any particular selected segment is encountered, it is not immediately identified as being a selected segment and therefore the segment will not be skipped. However, the next time the same segment is encountered, the segment will be immediately and automatically skipped. As more and more selected segments are encountered and their respective signature patterns stored, the more and more likely it becomes that any particular selected segment encountered while watching a television program will be promptly detected based upon its stored signature and automatically skipped. Hence, even though no stored signatures are initially provided, a database of signatures is soon developed. Also, the selected segment detection method may be performed even while the video recording and playback device is otherwise not in use to thereby detect and store segment signatures in a background mode to quickly develop a database of signatures. Alternatively, a database of the signatures of common segments, such as common commercial advertisement segments, may be initially provided at the time of manufacture or subsequently downloaded such that the common segments are thereby automatically skipped even the first time they are encountered.

For many television broadcast systems, commercial advertisements appear in groups of two or more. When used in connection with such systems, the method of the invention may operate to not only skip the detected commercial advertisements of a commercial advertisement group but rather to skip the entire group to thereby avoid playing other unwanted broadcast segments appearing within the group, such as station breaks, news bulletins, public service announcements, etc.

Depending upon the implementation, the method identifies the beginning of a segment by detecting pre-determined event markers which separate segments. When implemented for use in North America, the method may, for example, identify a period of one or more black frames combined with low audio as being an event marker representative of the beginning of a segment. When implemented for use in Europe, the method may instead identify periods of one or more colored frames, such as blue frames, combined with low audio as being an event marker. When implemented for use in Japan, the method may instead identify a frame break combined with a period of low audio as being an event marker. In any case, once an event marker denoting the beginning of a broadcast segment is detected, the method promptly extracts a signature from the segment for comparison against stored signatures. The signature may, for example, be a binary hash code representative of whether selected lines of a selected frame near the beginning of the segment exceed pre-determined luminance threshold levels. By extracting the signature near the beginning of the segment, a matching signature may be detected and the segment skipped without the viewer even noticing. Preferably, the signature is based on frames appearing during the first one second of the segment.

In an alternative embodiment, a video recording and playback device is controlled to pause recording of a television broadcast signal upon detection of a stored selected segment so that such segments are not recorded. In this embodiment as well, a library of selected segments may be stored over time as described above so that fewer and fewer of such segments will actually be recorded.

BRIEF DESCRIPTION OF THE DRAWINGS

The features, objects, and advantages of the present invention will become more apparent from the detailed description set forth below when taken in conjunction with the drawings in which like reference numerals identify correspondingly throughout and wherein:

FIG. 2 is a timing diagram illustrating exemplary groupings of consecutive commercial advertisement segments within a television broadcast signal analyzed by the system of FIG. 1 and illustrating event markers separating the broadcast segments;

FIG. 3 is a timing diagram illustrating the muting of luminance and audio portions of a television signal provided by the system of FIG. 1 for a pair of broadcast segments both identified as being commercial advertisements;

FIG. 4 is a timing diagram illustrating exemplary predetermined points in time following a first event marker wherein the system of FIG. 1 searches for a second event marker for the purpose of determining whether the first event marker corresponds to the beginning of a commercial advertisement segment and particularly illustrating a example wherein a second event marker is found at one of the predetermined points in time thereby indicating that the first event marker corresponds to the beginning of a commercial advertisement segment;

FIG. 5 is a timing diagram similar to that of FIG. 4, but wherein a second event marker is not found until after all of the predetermined points in time thereby indicating that the first event marker does not correspond to the beginning of a commercial advertisement segment;

FIG. 6 is a timing diagram similar to that of FIG. 4, but wherein a second event marker is found but not at one of the predetermined points in time thereby also indicating that the first event marker does not correspond to the beginning of a commercial advertisement segment;

FIG. 7 is a timing diagram similar to that of FIG. 4, wherein a second event marker is found at one of the predetermined points in time thereby also indicating that the first event marker corresponds to the beginning of a commercial advertisement segment but wherein yet another event marker, which must be ultimately ignored, is found between the others;

DETAILED DESCRIPTION OF EXEMPLARY EMBODIMENTS

Referring to the Figures, exemplary embodiments of the invention are first described for use with a television set for detecting commercial advertisements in a television broadcast signal. Upon detection of a commercial advertisement, the audio and video components of the received broadcast signal may be muted during the commercial advertisements. Alternatively, a secondary signal source may be substituted for viewing during the commercial advertisement. Initially, an overview is provided of the television set embodiment with reference to the block diagrams and timing diagrams of FIGS. 1–7. Then, further details of particular implementations are provided with reference to the flowcharts and block diagrams of FIGS. 8–16. Then, with reference to FIGS. 17–19, further exemplary embodiments are described for use with a video recording and playback unit. Commercial advertisements in a television broadcast signal may be detected either during the recording or playback process.

Television Set Embodiments

Figure 1:
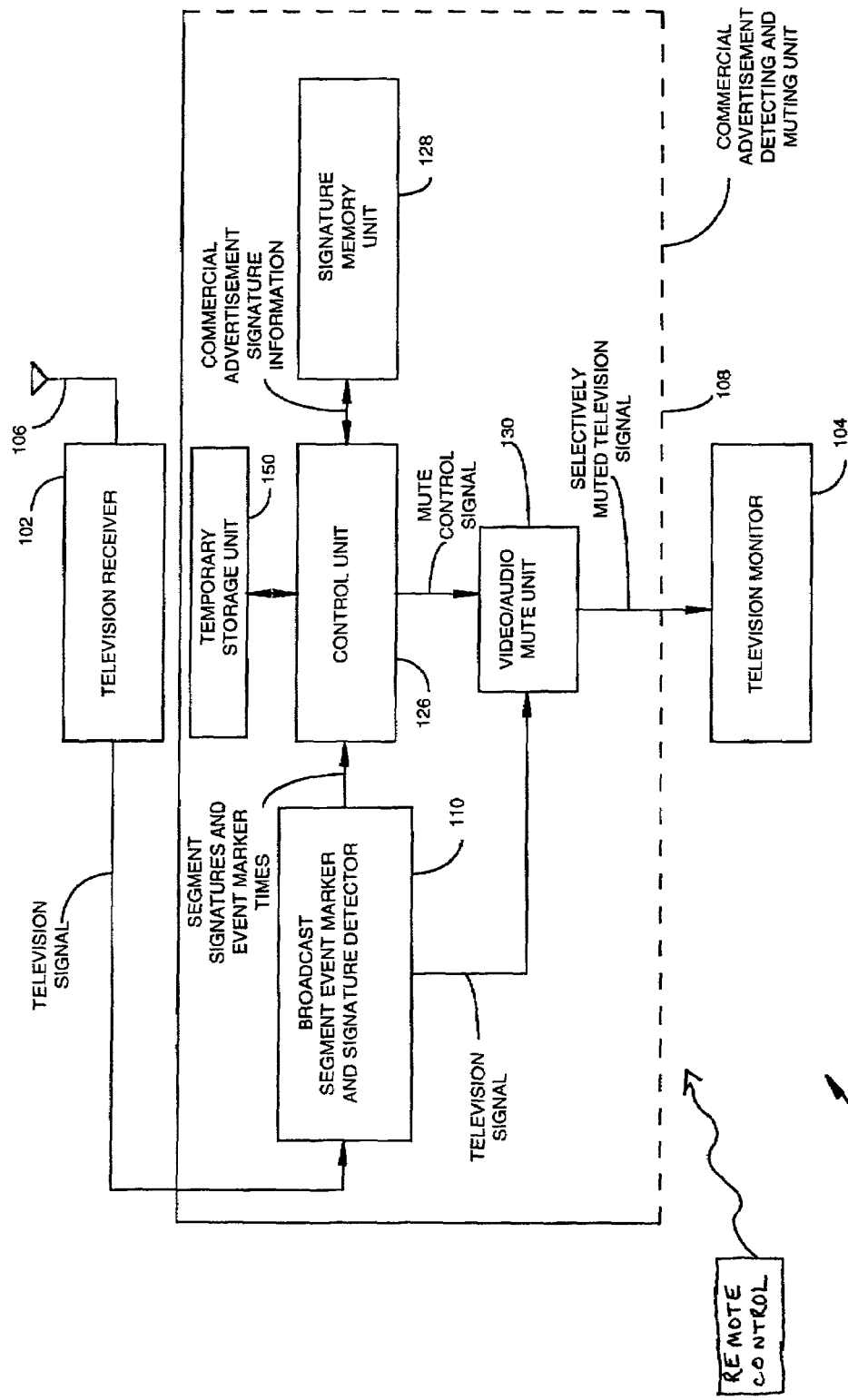
FIG. 1 is a block diagram illustrating a television set incorporating a commercial advertisement detecting and muting system configured in accordance with a first exemplary embodiment of the invention for detecting a commercial advertisement or other selected broadcast segment in real-time during a television broadcast and for muting video and audio portions of the television signal during the commercial advertisement.

FIG. 1 illustrates a television set 100 having a receiver 102 and a monitor 104. Television receiver 102, which includes a television tuner, receives an input broadcast television signal from an antenna 106 or from any other appropriate input source such as a coaxial cable input (not separately shown) and outputs a received television signal for eventual display by monitor 104. In this exemplary implementation, the received television signal is an analog NTSC signal including audio, luminance and chrominance components. In other implementations, the television signal is a PAL or SECAM signal or digital signal such as an HDTV signal. Monitor 104 displays the video portions of the television signal and plays the audio portions through speakers (not separately shown). Rather than routing the received television signal directly to the monitor for display, the television signal is first routed through a commercial advertisement detecting and muting system 108 which operates in real-time to detect target or selected segments of the television signal and to mute selected components of the television signal during those segments prior to output to monitor 104. In the exemplary implementation, the selected segments are commercial advertisements. The muted components of the television signal are the audio and luminance components. In other implementations, other selected segments may be detected or other components of the signal may be muted or otherwise processed. Commercial advertisement detecting and muting system 108 may be configured as a self-contained module having both analog and digital electronics for installation in an otherwise conventional television set. In other implementations, the commercial advertisement detecting and muting system may be provided as an after-market device configured for use with a television set having audio and video outputs. In still other implementations, particularly for digital television receivers, the commercial advertisement detecting and muting system may be implemented partially or entirely with software.

Detection of commercial advertisement segments is achieved as follows. Within detecting and muting system 108, the television signal is first routed through a broadcast segment event marker and signature detector 110 which detects event markers separating broadcast segments of the television signal and, for each segment, detects a signature. A broadcast segment may be a commercial advertisement segment or a portion of a television program, movie, news show, "infomercial" etc. hereinafter referred to as program segments. As noted, the broadcast segments are separated by event markers. In the exemplary implementation which is for use in North America, an event marker is a period of one or more black frames combined with low audio. When implemented for use in Europe, the event marker may also be a period of one or more colored frames, such as blue frames, combined with low audio. When implemented for use in Japan, an event marker is a frame break combined with a period of low audio extending from slightly before to slightly after the frame break.

Each unique broadcast segment has a unique signature. The signature may be any unique characteristic of the segment that can be used to distinguish one segment from another. As will be described below, in one exemplary implementation, the signature may be a bit string hash code representative of whether each of a set of selected lines of a selected frame of a received segment has an average luminance level that exceeds a pre-determined threshold. The selected frame may be, for example, the tenth frame following the completion of the event marker marking the beginning of the segment. The selected lines may be, for example, the first 64 odd lines of the frame beginning at line 23. Other signatures may alternatively be employed.

Referring again to FIG. 1, as each broadcast segment is received, the signature for that broadcast segment is detected in real-time by detector 110. The signature is routed to a control unit 126 which accesses a signature memory unit 128 to determine whether the detected signature matches any of a set of signatures stored therein known to correspond to commercial advertisement segments. If the detected signature matches one of the stored signatures, then the control unit identifies the broadcast segment from which the signature was taken as being a commercial advertisement segment and forwards a mute control signal to a video/audio mute unit 130. The mute unit also receives the television signal directly from detector 110. In response to the mute control signal, the mute unit mutes the audio and luminance components of the television signal during the commercial advertisement segment and forwards the muted signal to monitor 104. The mute control signal is maintained during the entire commercial advertisement segment. In the exemplary implementation, the signature memory unit stores, for each commercial advertisement signature, the length or duration of the segment. The control unit reads this information and thereby knows when to terminate muting. In other implementations, muting is terminated upon detection of a next event marker. The former technique is preferred because event markers may coincidentally appear in the middle of a commercial advertisement segment. If muting is always terminated upon detection of a next event marker, muting could erroneously be removed in the middle of a commercial advertisement.

Hence, the system mutes the output signal during a detected commercial advertisement segment. Additionally, the system may continue the mute throughout an entire commercial advertisement group containing the detected commercial advertisement segment. To this end, the system determines when the commercial advertisement group began and continues muting for at least some minimum predetermined time period, such as two minutes, following the beginning of the group. In this manner, non-commercial advertisements of the group are muted as well as any commercial advertisements of the group not having a previously stored signature. The manner by which the system determines the beginning of a commercial advertisement group for the purposes of muting the entire group will be described below.

In some implementations, "muting" means that the amplitudes of the audio and luminance components of the output signal are reduced such that the viewer of monitor 104 sees a dimmed image and hears reduced audio levels. In more general terms, "muting" is used to refer to any alteration of the broadcast signal, either upon reception, during recording of the signal or during playback of a previously recorded signal. Such alteration may include, in addition to reducing audio and video levels, switching to an alternate signal source, suspending recording of a signal or skipping past certain segments of recorded material during playback.

FIG. 3 is a timing diagram illustrating the muting of luminance 132 and audio 134 components of a television signal during two consecutive detected commercial advertisement segments between a pair of un-muted program segments. As can be seen, the levels of both the audio and luminance components are ramped down immediately after the beginning of the first commercial advertisement segment and are ramped up immediately after the end of the second commercial advertisement segment. Mute unit 130 (FIG. 1) also superimposes an audio chime over the audio signal as the audio signal is increased to its pre-mute level. The chime is provided to alert a viewer that the muted commercial advertisement segments have completed. This is particularly desirable if the next program segment begins with a silent audio track, perhaps accompanied by program credits. Without the chime, the viewer, whose attention may be elsewhere, might not realize that a program segment of interest is beginning. In other implementations, the chime may also be produced at the beginning of each muted commercial advertisement segment.

Referring again to FIG. 1, if the signature detected by detector 110 does not match any of the stored signatures of memory unit 128 and the system is not currently muting an entire commercial advertisement group, then no mute control signal is provided to mute unit 130 and the television signal is thereby forwarded without modification by the mute unit to monitor 104. In this manner, program segments remain un-muted. More specifically, when a program segment is received, its signature is detected and compared against those of memory unit 128. Because the memory unit only stores segments corresponding to commercial advertisement segments or other selected broadcast material, the program segment signature will not match any stored segment and no muting will therefore occur during the program segment.

Hence, commercial advertisement detecting and muting system 108 operates to mute in real-time any broadcast segment having a signature matching one of the signatures of memory unit 128. Naturally, commercial advertisements will be received for which a signature was not previously recorded in memory unit 128 and the commercial advertisement will therefore not be muted (unless it is part of an entire group of commercial advertisements being muted). The library of signatures in memory unit 128 may be built up in various ways. One approach automatically adds a new signature when a commercial advertisement is detected with a signature not already in the library. Detecting and muting system 108 may be provided with a means for determining whether a broadcast segment, having a signature that does not match any signature recorded in the database, nevertheless is a commercial advertisement segment. Once a determination is made that a broadcast segment is a commercial advertisement segment or other selected segment, the signature of the segment is added to the database such that the segment can be muted in real-time the next time it is encountered.

Another approach adds a new signature upon receipt of an operator command. This "manual" approach allows the television viewer to designate a particular commercial advertisement or other broadcast segment for muting whenever it is re-broadcast. The remote control unit for television set 100 may be provided with a button or other control that effectively operates as a "kill this commercial" switch. Of course, the manual and automatic signature capturing process are not mutually exclusive.

Signatures may also be pre-stored in memory unit 128 prior to delivery of television set 100 to the consumer or may be downloaded periodically from a central storage unit. Signatures may be downloaded on an otherwise unused broadcast channel or may be encoded within an active broadcast channel, such as in the vertical blanking interval. Signatures may also be downloaded via a telephone connection or via a dedicated communications connection.

Automatic Addition of Signatures to Library

In some implementations of the invention, commercial advertisement segments may be distinguished from program segments automatically for the purpose of creating a library of signatures. The automatic recognition process relies on the observation that commercial advertisement segments almost always appear in groups of two or more and are each of one or more relatively short pre-determined lengths such as 15 seconds, 30 seconds and 60 seconds. The groups are typically at least two minutes long. FIG. 2 illustrates an exemplary television signal having program segments 112, 114, and 116 followed by groups of commercial advertisement segments 118, 120 and 122, respectively, with each segment separated by an event marker 124. Commercial advertisement group 118 includes two commercial advertisement segments of 60 seconds each. Group 120 includes two commercial advertisement segments of 30 seconds and one of 60 seconds. Group 122 also includes two 60 second commercial advertisement segments. Although not shown in FIG. 2, commercial advertisement groups may additionally include other segments such as station breaks, news bulletins, public service announcements etc., which are typically not of the same lengths as commercial advertisements, i.e. the other segments are not 15, 30 or 60 seconds long. If other segments are included, the group is typically at least two minutes and twenty seconds long. The manner by which the non-commercial advertisement segments within a group are processed will be described below.

The automatic determination of whether a broadcast segment is a commercial advertisement segment or other selected segment, assuming that its signature does not match a stored signature, is achieved as follows. As noted above, and as illustrated in FIG. 2, commercial advertisement segments are distinguishable from program segments in that commercial advertisement segments almost always appear in groups of two or more and are each of one or more relatively short predetermined durations such as 15 seconds, 30 seconds and 60 seconds. Accordingly, if an event marker corresponds to the beginning of a commercial advertisement segment, a second event marker should occur after one of the pre-determined periods of time following the first event marker. If an event marker corresponds to the beginning of a program segment, a second event marker will not likely occur until after one of the pre-determined periods of time following the first event marker.

Hence, if a second marker occurs, for example, 15, 30 or 60 seconds following a first event marker, a determination is made that the segment between the first and second event markers is therefore probably a commercial advertisement or other selected segment and the signature detected following the first event marker is added to the signatures stored in memory unit 128 (FIG. 1). If a second marker does not occur at 15, 30 or 60 seconds following a first event marker, a determination is made that the segment between the first and second event markers is therefore probably not a commercial advertisement segment and the signature detected following the first event marker is merely discarded.

In practice, for North American broadcast systems, the lengths of commercial advertisements often deviate slightly from the standard 15, 30 and 60 second durations. Accordingly, the system searches for subsequent event markers within a range of time centered around each expected event marker time. For a 30 second commercial advertisement, the system may search, for example, for event markers occurring 28 to 32 seconds following a previous event marker.

In any case, if a determination is made that a broadcast segment is a commercial advertisement, then the next time the same commercial advertisement segment is received the following occurs. The signature of the commercial advertisement segment is again detected by detector 110 and compared against those stored in memory unit 128. Upon determining that the newly detected signature matches the previously stored signature, the commercial advertisement segment is muted in real-time. In this manner, the system builds a database of commercial advertisement segment signatures and each commercial advertisement segment is typically displayed only once in its un-muted form. Thereafter, as long as the signature of the commercial advertisement segment remains in the database, the segment is detected and muted in real-time. Hence, even if the signature database of memory unit 128 is initially empty, a database of commercial advertisement signatures is developed and soon all or most commercial advertisements that are commonly shown are detected and muted. Of course, it is possible for a non-commercial segment of a desired television program to be 15, 30 or 60 seconds long such that its signature will be added to the database along with those of commercial advertisements. Hence, the next time the same television program is received the segment will be muted under the assumption that it is a commercial advertisement. This is not a particularly significant problem. The viewer merely over-rides the mute and continues to view the program. Moreover, television programs are not typically viewed repeatedly and, as will be described below, the system may be configured to erase signatures not frequently encountered such that, the next time the same television program is viewed, the signature of that segment of the program may have already been erased. Also, it is possible for news bulletins, public service announcements etc. to also be 15, 30 or 60 seconds long such that their signatures will be added to the database for future muting. Again, this is not a significant problem. Indeed, if the news bulletins, public service announcements etc. are broadcast frequently, the viewer may consider their subsequent muting to be quite advantageous.

As noted, a determination of whether a segment constitutes a commercial advertisement segment even though its signature does not match a stored signature is performed based upon the time periods separating event markers. FIGS. 4–7 illustrate various examples of event marker groupings within a television signal to help illustrate the manner by which this determination of a commercial advertisement segment is performed.

FIG. 4 illustrates an example wherein a second event marker occurs at one of the predetermined time periods following a first event marker. More specifically, FIG. 4 shows a pair of event markers 133 and 135 occurring 60 seconds apart. Shortly after first event marker 133 is detected, the signature for the program segment beginning at that event marker is temporarily recorded. Then, a determination is made as to whether a second event marker occurs at 15, 30 or 60 seconds following the first event marker. In the example of FIG. 4, second marker 135 is detected 60 seconds from the first marker. Accordingly, shortly thereafter, the temporarily recorded signature is saved i.e. it is stored in memory unit 128 (FIG. 1) along with any other pertinent information such as the duration of the corresponding commercial advertisement as determined by the time period between the first and second event markers. If the second marker had alternatively occurred at either 15 or 30 seconds following the first event marker, the signature would have been saved then instead.

With further reference to FIG. 4, it should be noted that the detection of second event marker 135 also triggers a temporary recording of the signature of the segment beginning at the second event marker. This signature is compared with those stored in the memory unit (FIG. 1). As with the first signature, if a match is detected then the broadcast segment beginning at the second event marker is immediately muted and if no match is detected, then the signature is temporarily recorded until a determination can be made whether the broadcast segment beginning at the second event marker is nevertheless a commercial advertisement segment.

FIG. 5 illustrates an example wherein a second event marker does not occur at one of the pre-determined time periods following a first event marker. More specifically, FIG. 5 shows a pair of event markers 136 and 138 occurring more than 60 seconds apart. Shortly after first event marker 136 is detected, the signature for the broadcast segment beginning at that event marker is temporarily recorded. Then, a determination is made as to whether a second event marker occurs at 15, 30 or 60 seconds following the first event marker. In the example of FIG. 5, no event marker is detected at either 15, 30 or 60 seconds following the first event marker. Accordingly, shortly after the time of event marker 136 plus 60 seconds, the temporarily recorded signature is discarded. (Again it should be noted that the detection of the second event marker also triggers a temporary recording of the signature of the segment beginning at the second event marker and processing of that signature proceeds.)

FIG. 6 illustrates an example where a pair of first and second event markers 140 and 142 are separated by less than 60 seconds but where second event marker 142 does not occur at one of the pre-determined intervals. Hence, the first marker does not correspond to the beginning of a commercial advertisement or other selected segment. It should be noted that the determination that the first marker does not correspond to a commercial advertisement is not made until 60 seconds following the detection of the first event marker. Accordingly, the temporarily recorded signature recorded following the first event marker is not discarded until after the 60 second mark. The detection of the second event marker in the interim does not terminate the search for additional event markers based upon the first event marker. That search continues until at least 60 seconds from the first event marker. Also, the detection of the second event marker triggers a temporary recording of a second signature and a contemporaneous search for additional event markers following the second event marker at 15, 30 or 60 second intervals.

FIG. 7 illustrates an example where a pair of event markers 144 and 146 are separated by 30 seconds. Hence, the first marker corresponds to a commercial advertisement, and a signature temporarily recorded shortly after the first event marker is stored along with other pertinent information in the database of memory unit 128 (FIG. 1). It should be noted that the determination that the first and second event markers 144 and 146 correspond to the beginning and end of a commercial advertisement is made shortly after second event marker 146 is detected and is not deferred until 60 seconds from the first event marker. Also, FIG. 7 shows another event marker 148 occurring between event markers 144 and 146 but not at one of the predetermined time periods. The detection of the additional event marker in the interim between event markers 144 and 146 does not terminate the search for an additional event marker at any of the predetermined time periods from the first event marker. The detection of event marker 148 however triggers a temporary recording of another signature immediately thereafter and a contemporaneous search for event markers following at 15, 30 or 60 second intervals.

Hence, FIGS. 6–7 illustrate that more than one signature may be temporarily recorded at any given time and that multiple contemporaneous searches may be performed for subsequent event markers with one search for each event marker. Indeed, in the exemplary implementation, each event marker, for which the corresponding signature is not found in the signature database, triggers a search for an additional event marker at one of the pre-determined intervals thereafter. As each search may last as long as 60 seconds during which time a number of additional event markers may be encountered, a number of signatures may need to be simultaneously temporarily stored and coordinated. Additionally, the time that each event marker is detected is recorded to allow calculation of the various time intervals. Accordingly, a temporary signature and event marker time memory unit 150 is provided in connection with control unit 126 of FIG. 1 for storing the temporary signatures and the time of the event marker corresponding to each temporarily stored signature. Signatures stored therein are either erased after 60 seconds, if no event marker is detected at any of the pre-determined intervals, or transferred to the signature memory unit 128, if an event marker is detected at any of the pre-determined intervals. In the exemplary embodiment, control unit 126 of FIG. 1 coordinates storage of information within temporary memory unit 150 and performs the various searches for additional event markers. In this regard, the control unit may be a microprocessor pre-programmed with appropriate software to coordinate the aforementioned operations. Alternatively, the control unit may be a dedicated integrated circuit pre-configured with appropriate hard-wired logic to coordinate the operations. Other appropriate devices may be employed as well.

Thus, by detecting various event marker times, the system can determine whether a segment, which does not have a matching stored signature, is nevertheless a commercial advertisement segment. Hence, each received commercial advertisement is detected either immediately via a signature match or at the end of the segment via an event marker analysis. Once a commercial advertisement is detected, the system determines whether it represents the beginning of a new commercial advertisement group and, if so, muting is maintained for at least two minutes thereafter, regardless of whether the subsequent segments have matching signatures in the database. In one implementation, this is achieved as follows. For any detected commercial advertisement segment, if no other commercial advertisement segment preceded it during the previous 60 seconds, or some other predetermined minimum period of time, then the system identifies the detected commercial advertisement segment as being the first of a new group. If it were not the first of a new group, then a previous commercial advertisement segment of the same group would at least have terminated at some point during the preceding 60 seconds. (This assumes that no two consecutive commercial advertisement segments of a common group are ever separated by more than 60 seconds of non-commercial advertisement segments such as station breaks etc. In most cases, this assumption is correct.) Once the system identifies the first commercial advertisement of the group, muting is initiated and maintained for at least two minutes, or some other predetermined minimum group time period, from the beginning of that commercial advertisement. Notably, this determination is made regardless of whether the commercial advertisement was detected via signature match or event marker analysis. If detected by signature match, the determination is made during the reception of the commercial advertisement. If detected via event marker analysis, the determination is not made until the end of the segment. In either case, the duration of continuous muting is calculated based on the beginning of the first commercial advertisement segment of the group. As noted, muting is maintained for some predetermined period of time representative of the minimum duration of a group of commercial advertisements such as two-minutes. Any particular group may be longer in duration and continuous group-based muting may therefore end during the group. Signature-based muting, however, will continue for any remaining commercial advertisements of the group that have matching signatures in the database. Hence, the remaining advertisements of the group will not necessarily be unmuted. Other techniques for detecting the beginnings and predicting the endings of commercial advertisement groups may alternatively be employed.

Manual Addition of Signatures to Library

Instead of or in addition to the above-described process of automatically adding signatures of detected commercial advertisement segments to memory unit 128, a signature may be added by an operator command. While viewing a television broadcast, a commercial advertisement segment may be encountered that does not already have a stored signature and, therefore, is not muted. If the viewer wishes to have future airings of this commercial advertisement segment muted, the viewer need only press an appropriate button or other control on the remote control unit for television set 100. The signature associated with the most recent event marker is then added to memory unit 128. Thereafter, a re-broadcast of the same commercial advertisement segment will be detected and muted as previously described.

Methods of Operation

With reference to the remaining Figures, further details of exemplary and alternative method and apparatus embodiments of the invention will be described.

Figure 8:
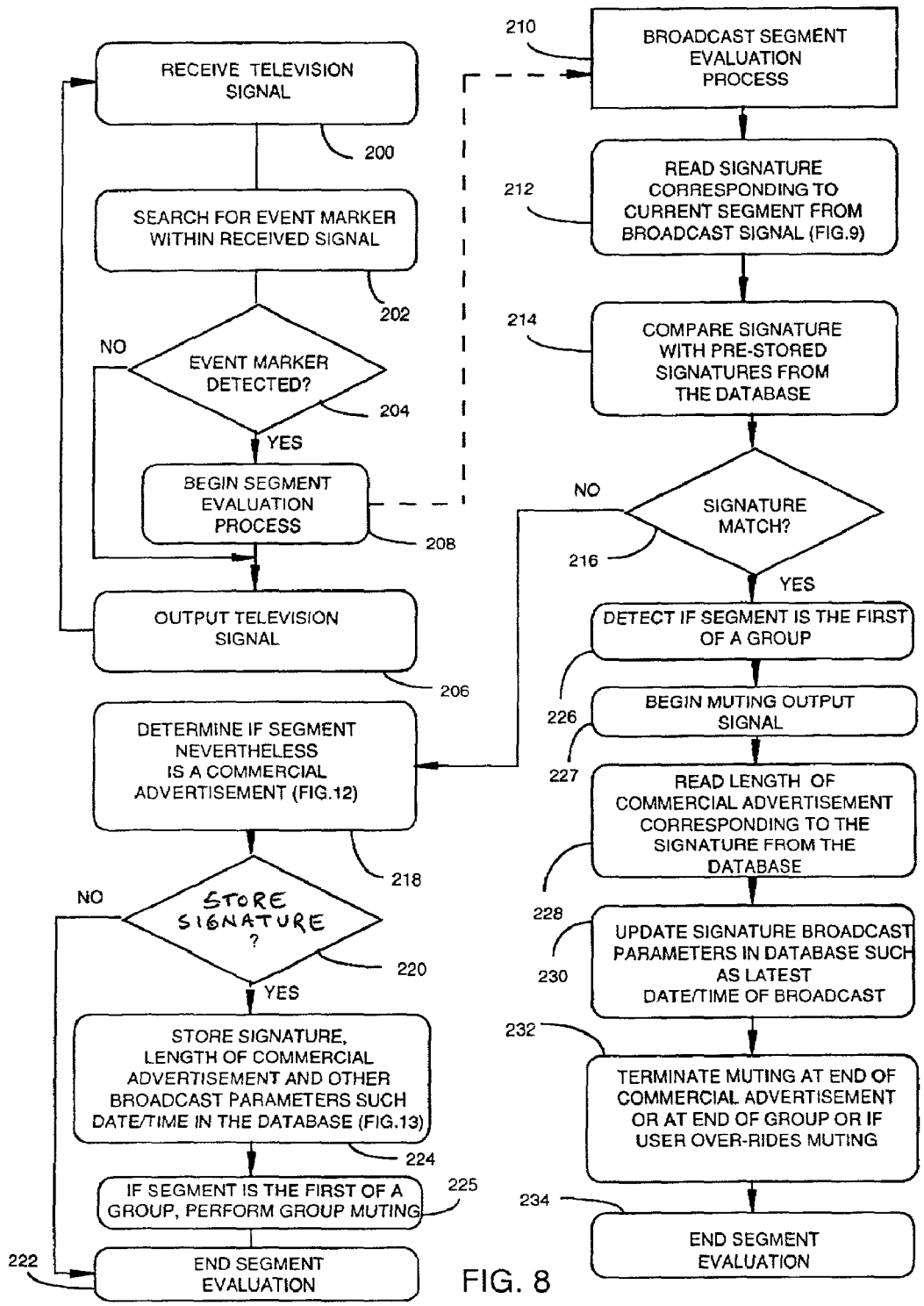
FIG. 8 is a flowchart illustrating an exemplary method performed by the system of FIG. 1 while the television set is in operation for detecting and muting commercial advertisements during a television broadcast wherein, among other features, a signature corresponding to an event marker is compared against a database of signatures corresponding to known commercial advertisements to determine whether the event marker corresponds to the beginning of a commercial advertisement segment.

FIG. 8 is a flowchart summarizing steps performed by the commercial detection and muting system of FIG. 1 or by any other appropriate system for performing commercial advertisement detection and muting. As many of these steps have already been described above, only additional aspects of the detection and muting technique will be described in detail. Initially at step 200, a television broadcast signal is received. The television signal is searched to detect event markers, step 202. If an event marker is not detected, step 204, the television signal is merely output at step 206 perhaps to a display device such as monitor 104 (FIG. 1). Steps 200, 202, 204 and 206 are repeated until an event marker is detected at step 204 triggering the beginning of a broadcast segment evaluation process for the broadcast segment beginning at the detected event marker, step 208. As will be described below, the broadcast segment evaluation process operates to determine whether the broadcast segment beginning at the corresponding event marker is a commercial advertisement and if so mutes the output of the television signal during the commercial advertisement. After the broadcast segment evaluation process has been triggered for that event marker, step 206 is again executed to continue outputting the television signal. Hence, the television signal is not stored or otherwise delayed but is immediately output in real-time. The broadcast segment signature evaluation process is performed shortly after detection of the event marker such that very little of the television signal is output before a determination of whether the signal needs to be muted is achieved.

Steps 200–206 are repeatedly performed to search the television signal for additional event markers. Each newly detected event marker triggers a separate broadcast segment signature evaluation process for the broadcast segment beginning at that event marker. If part of the system performing the method of FIG. 8 is implemented as a software program, the individual broadcast segment evaluation processes may be, for example, separate and distinct software processes running on a microprocessor or may merely be separate logic threads within a single software process. They are described herein as separate processes primarily to help clarify that contemporaneous searches for subsequent event markers may need to be performed for each of a set of consecutive event markers and not to imply any particular architecture by which the method of FIG. 8 must be implemented.

Beginning at step 210, one broadcast segment evaluation process triggered at step 208 is set forth. Step 210 is shown connected to step 208 by a dashed line to indicate that the broadcast segment evaluation process proceeds independently of, and contemporaneously with, steps 200–206. At step 212, the signature corresponding to the current broadcast segment is read from the television signal. Additional details of step 212 are step forth in FIGS. 9–11 and will be described below. At step 214, the signature is compared against stored signatures in a database of signatures known to correspond to commercial advertisements or other unwanted broadcast material. If there is no signature match, step 216, then step 218 is performed to determine whether the current broadcast segment nevertheless comprises a commercial advertisement segment for which a signature should be stored and, if so, what the length of the commercial advertisement segment is in seconds. Additional details of step 218 are set forth in FIG. 12 and will be described below. If a signature is not to be stored at step 220 (e.g., if the current segment is determined to not be a commercial advertisement), then step 222 is executed to end the broadcast segment evaluation process. If, however, a signature is to be stored (e.g., the current segment is determined to be a commercial advertisement), step 224 is executed to store the signature of the current segment read at step 212 in the database such that, when the same commercial advertisement segment is encountered again, the commercial advertisement can be detected in real-time. As noted above, the determination of whether a broadcast segment comprises a commercial advertisement segment may take up to 60 seconds from the event marker defining the beginning of the segment. Additional details of step 224 are set forth in FIGS. 13–16 and will be described below.

At step 224, in addition to storing the signature for the current broadcast segment, the system also stores the length of the commercial advertisement and other pertinent information such as the latest date and time of day (date/time) of the broadcast of the segment. The length is used to determine how long to mute the output signal if the same commercial advertisement is again encountered. The latest date/time of broadcast can be employed to selectively erase signatures from the database based upon how recently the signatures had been encountered. More information regarding the content and purpose of information stored in the database along with the signature will be described in greater detail below. After the database is updated at step 224, step 225 is performed to determine whether the detected commercial advertisement is the first of a group and if so continuous group-based muting, described above, is performed until at least the end of the minimum pre-determined group time period, assuming no user over-ride. Then, step 222 is executed to end the current broadcast segment evaluation process.

Hence steps beginning at step 218 are performed only if the signature of the current broadcast segment does not match any in the database as determined at step 216. If there is a signature match at step 216 indicating that the current broadcast segment is a commercial advertisement, the system first determines whether the commercial advertisement is the first of a group, step 226, and then begins muting the output television signal, step 227, by using a mute control signal in the manner described above with reference to FIGS. 1 and 3. Accordingly, television signals output at step 208 are muted and will remain muted until the mute control signal is deactivated. If the advertisement is the first of a group, the muting will ultimately continue until the end of the predetermined minimum group time period as described above, assuming no user over-ride. If not, muting will continue until the end of the advertisement, again assuming no over-ride. The length of the commercial advertisement is then read from the database, step 228, such that system can determine the end of the current commercial advertisement segment. Hence, if a previously triggered group-based muting terminates during the current segment, the system will continue to mute until the end of the segment. At step 230, the system updates the parameters stored with the signature, such as the latest date and time of broadcast. Then, at step 232, the muting is terminated either upon user over-ride or upon the latter of the completion of the current commercial advertisement segment and the completion of the current group (as determined by the minimum pre-determined group time period) if group-based muting had been triggered. The current commercial advertisement segment, as with all segments, ends with an event marker which is detected at step 204 triggering another broadcast segment evaluation process.

Hence, FIG. 8 illustrates that broadcast segment evaluation processes are triggered upon the detection of each event marker. As discussed above, each broadcast segment evaluation process may take up to 60 seconds to determine whether the broadcast segment beginning at the event marker triggering the process is a commercial advertisement or not. During that period of time a number of other event markers may be detected and a broadcast segment evaluation process triggered for each one. Hence, a number of evaluation processes may proceed simultaneously. The resolution of one process may moot or obviate some of the latter-triggered processes. For example, if a first triggered process determines that the corresponding broadcast segment is a commercial advertisement, then any event markers detected before the end of the broadcast segment thereby occurred during the commercial advertisement and therefore do not represent the beginnings of unique commercial advertisements, and the broadcast segment evaluation processes triggered thereby may be terminated. In other words, if a commercial advertisement is detected because a pair of event markers are found to be exactly 60 seconds apart, any other event markers detected during that 60 second period thereby occurred during the 60 second commercial and therefore can be ignored. On the other hand, if after 60 seconds a first triggered process determines that a first event marker at the beginning of that 60 second period is not the beginning of a commercial advertisement, then any event marker detected after that first event marker may itself represent the beginning of a commercial advertisement segment, and the broadcast segment evaluation processes triggered thereby may not be terminated until the situation is further resolved. Conversely, if a second triggered process determines that the corresponding broadcast segment is a commercial advertisement, then any event markers detected before the beginning of that broadcast segment occurred before the commercial advertisement began and therefore do not themselves represent the beginnings of unique commercial advertisements, and any broadcast segment evaluation processes triggered thereby may be terminated. For clarity in illustrating the basic process of the invention, the details of the logic by which the resolution of one broadcast segment evaluation process affects others are not set forth in FIG. 8 but may be readily incorporated within a computer program or other logic device configured for implementing the method of the invention in accordance with the teachings provided herein.

With reference to FIGS. 9–16 details of exemplary implementations of some of the steps of FIG. 8 will now be described.

Figure 9:
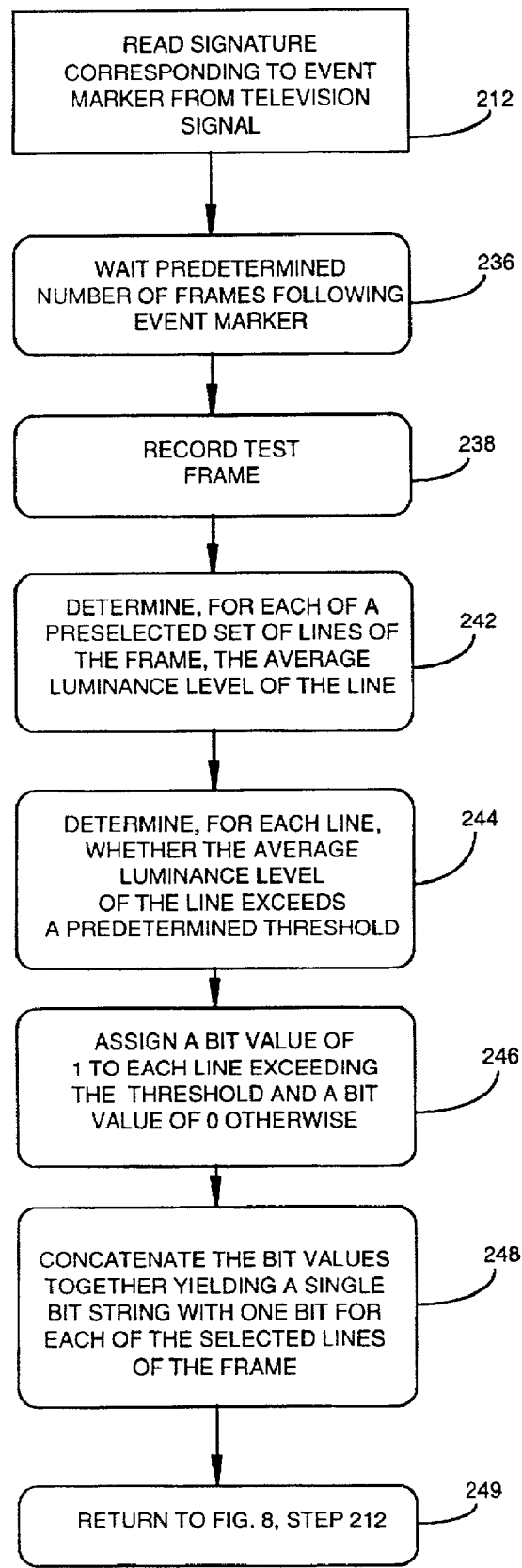
FIG. 9 is a flowchart illustrating steps performed in furtherance of the method of FIG. 8 to read a segment signature corresponding to an event marker.
Figure 10:
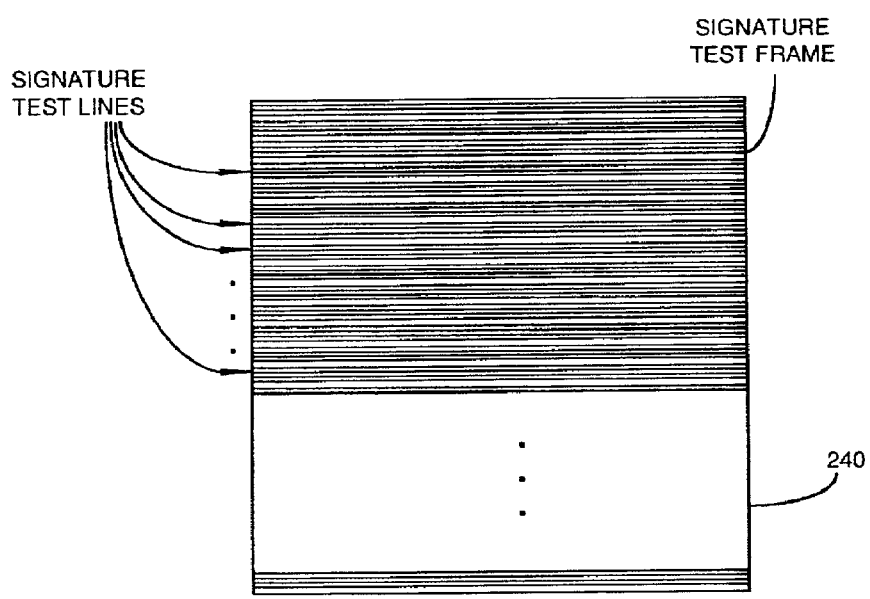
FIG. 10 is a representation of a single exemplary test frame of a television broadcast signal analyzed during execution of the steps of FIG. 9 and in particular illustrating exemplary signature test lines of the frame from which the signature is determined.

As noted, step 212 of FIG. 8 operates to read a signature corresponding to an event marker from the broadcast signal. Any of a wide variety of techniques for defining the signature of a broadcast segment and for reading and recording the signature may be employed. FIG. 9 sets forth one exemplary technique for reading a signature corresponding to an event marker from a broadcast signal. At step 236, the system waits a pre-determined number of frames from the completion of the event marker. The system may wait, for example, 10 frames or the equivalent period of time. At step 238, the system then records the current frame, e.g., the system takes a snap shot of the tenth frame, hereinafter referred to as the test frame. An exemplary test frame 240 is illustrated in FIG. 10. At step 242, the system determines, for each of a preselected set of signature test lines of the test frame, the average luminance level of the lines. The signature test lines may be, for example, the first 64 odd lines of the frame beginning at line 23 or perhaps the 5th, 10th, 15th etc. lines. A few exemplary signature test lines are identified in FIG. 10. The average luminance level of each line may be determined, for example, by routing the luminance signals for those lines through circuitry (not shown) configured to generate a test voltage level representative of the average voltage level of the luminance signal. At step 244 a determination is made, for each signature test line, as to whether the average luminance level for that line exceeds a predetermined threshold. This determination may be made, for example, by defining the threshold level in terms of a threshold voltage level and comparing the test voltage level with the threshold voltage level. At step 246, the system assigns a bit value of 1 to each line exceeding the threshold luminance level and a bit value of 0 otherwise. Of course, opposite bit values could alternatively be employed. At step 248, the bit values are concatenated together yielding a single binary bit string hash code signature with one bit per test line of the test frame. An exemplary bit string 250 is set forth in FIG. 11. Execution then returns to step 212 of FIG. 8 via step 249 where the signature is compared against those in the database.

Hence, a bit string signature is evaluated based upon the average luminance level of selected lines of one selected frame following the event marker. Any bit string of suitable length may be employed. If too few test signature lines are selected yielding a short bit string, the bit string may not have sufficient bits to uniquely identify the broadcast segment. Accordingly, it is preferred that at least 32 signature test lines are selected yielding a bit string of at least 32 bits. With 32 bits, it is reasonably unlikely that test frames from different program segments will have the same bit string and hence, the bit string can be used to uniquely identify each unique broadcast segment. Also, a test frame occurring fairly promptly after the event marker should be selected. If a test frame is selected that occurs too late after the event marker, the system will not be able to promptly determine whether the signature of the test frame matches any of the recorded signatures and will therefore not be able to promptly begin real-time muting. Hence, it is preferred that the test frame occur no longer than about one second after the event marker. In alternative implementations, signature test lines may be drawn from two or more separate test frames.

Figure 11:
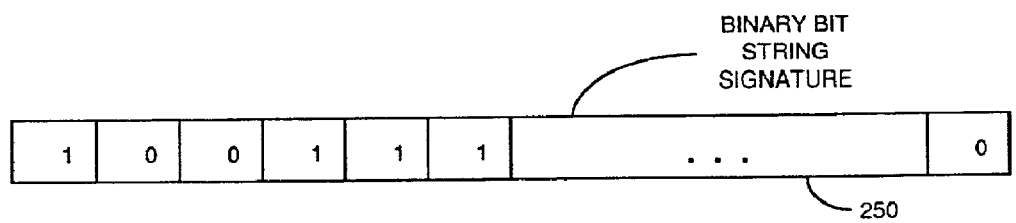
FIG. 11 is a representation of an exemplary bit string binary hash code signature corresponding to the frame of FIG. 10 and in particular showing exemplary bit values each representative of whether the average luminance of a corresponding test line of the frame exceeds a pre-determined threshold.

Thus FIGS. 9–11 set forth exemplary techniques for reading a signature wherein a bit string is generated based upon whether average luminance levels of selected signature test lines of a selected test frame exceed a threshold level. Of course, the same test signature lines, the same test frame and same threshold level must be employed each time to ensure that the same bit string is generated every time the same broadcast segment is encountered. Hence, care should be taken in detecting and comparing signatures to compensate for skew or other factors in the television signal. Details of one possible system for detecting and comparing signatures which addresses skew and other factors is set forth in U.S. Pat. No. 5,504,518 summarized above.

If the television signal is digital, average luminance levels need not be employed. Rather, the signature may be simply based on selected bits within one or more selected digital frames. Skew and other related problems are also avoided or more easily overcome.

Figure 12:
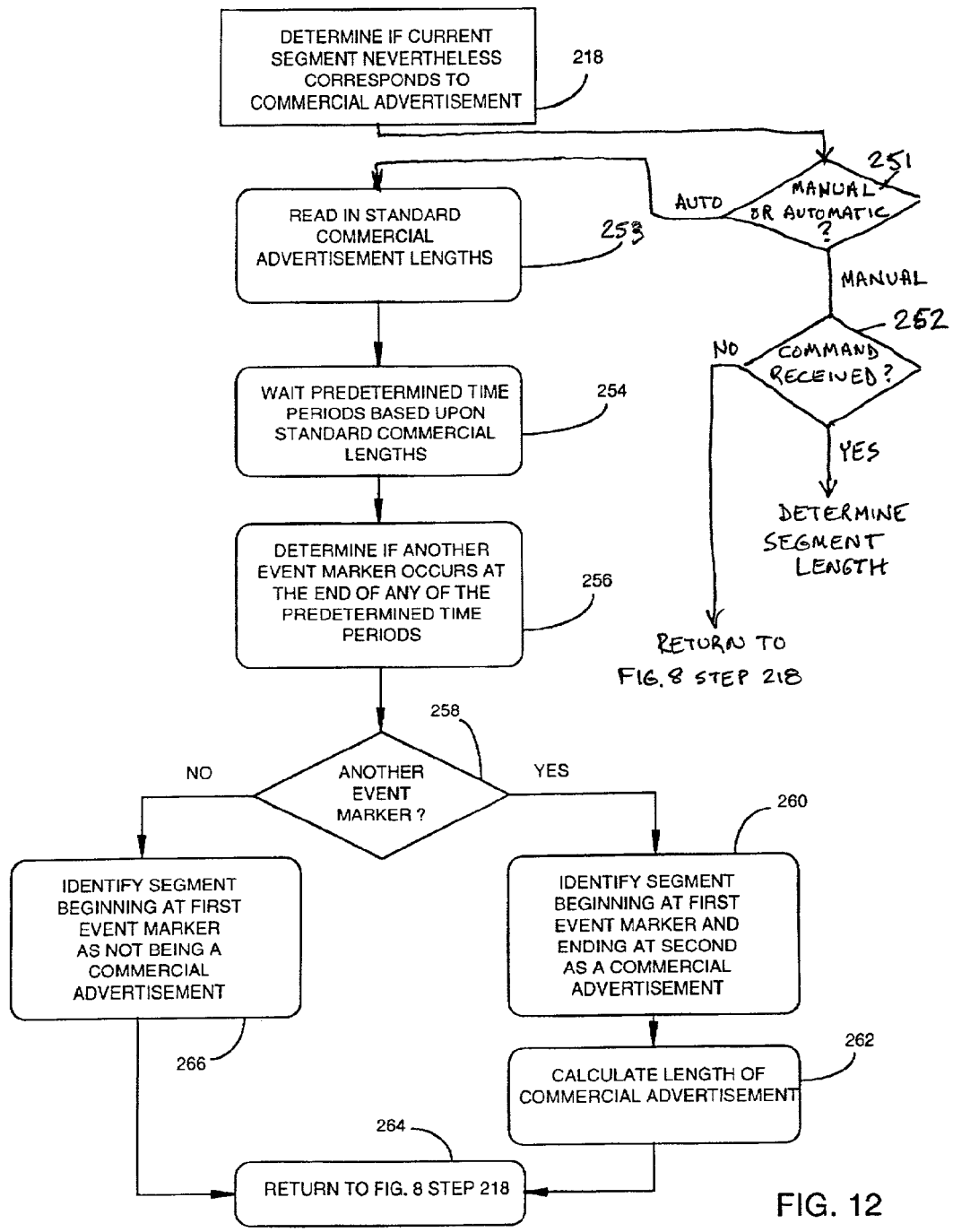
FIG. 12 is a flowchart illustrating steps performed in furtherance of the method of FIG. 8 to determine if an event marker nevertheless corresponds to the beginning of a commercial advertisement segment even though the signature corresponding to the event marker does not match any of the signatures of the database.

As noted, step 218 of FIG. 8 operates to determine if the current broadcast segment, for which no signature match is found, nevertheless corresponds to the beginning of a segment for which a signature should be stored in the database. FIG. 12 sets forth one exemplary technique for making the determination. An overview of the technique was provided above in connection with FIGS. 4–7. At step 251, it is first determined whether the system is operating in a manual or automatic mode for adding signatures to the library. Any particular device may have only one such mode enabled. Alternatively, a device may have both modes implemented and operating concurrently or may leave the choice of mode to the user. In the manual mode of operation, control passes to step 252 to determine if an operator command has been sent to designate the current segment for storage of a signature. Such a command may be sent, for example, using an infrared remote control device. If the command is detected, the signature extracted in step 212 (FIG. 8) is designated for storage.

In the manual mode, the segment length can be determined in one of two ways. First, in a purely manual mode, the operator may designate the end of the segment with another command. The interval between the corresponding event markers preceding each of the two commands is then stored as the length of the segment. This is particularly useful for designating segments that do not have standardized lengths. Secondly, event markers may be processed as in the automatic mode, which is described next. In this case, the manual designation command is treated as a flag to ensure that a segment is classified as a commercial advertisement. Returning to step 251, if the automatic mode is enabled, the process proceeds to step 253 where a set of predetermined time periods based on standard commercial advertisement lengths are read from a memory. Examples include 15 seconds, 30 seconds, 60 seconds. At step 254, the system sets appropriate timers to begin waiting each of the pre-determined time periods. At step 256, the system determines whether a second event marker occurs at any of the pre-determined time periods following the first event marker. For example, the system first waits 15 seconds from the time of the first event marker and detects whether the television signal includes an event marker at that point in time. If not, the system waits until 30 seconds from the first event marker and so on. If a second event marker is detected at any of the predetermined times, step 258, then step 260 is performed wherein the broadcast segment beginning at the first event marker is identified as a commercial advertisement. At step 262, the system determines the length of the commercial advertisement by comparing the time the second event marker was detected with that of the first marker. Execution thereafter returns through step 264 to step 218 of FIG. 8. If at step 258, no event marker is found at any of the pre-determined time periods following the first event marker, then step 266 is performed wherein the broadcast segment starting at the first event marker is identified as not being a commercial advertisement segment and again execution returns to step 218 of FIG. 8.

Step 224 of FIG. 8 operates to store the signature and other pertinent information in the database if the broadcast segment is found to be a commercial advertisement. The database, however, may be full. A determination then needs to be made as to which previously stored signatures, if any, should be overwritten to make room for the newly recorded signature. FIGS. 13–16 set forth details of one exemplary technique. At step 268, the system determines whether the database is full and if not, step 270 is performed to store the signature, the length of the commercial advertisement for the segment corresponding to the signature and the date/time the event marker marking the beginning of the commercial advertisement was detected. Other information may also be recorded for the purpose of allowing the system to intelligently decide which records to erase as the database becomes full. For example, if the system is configured to detect commercial advertisements even while the television set is otherwise not in use (as will be described in greater detail below with reference to FIG. 16), the system also stores an in-use weighting factor, which may be a single bit value, indicating whether the commercial advertisement was detected during a period of time when the television was not otherwise in use or whether it was detected while the television was in use. The system may also increment a counter identifying the number of times the commercial advertisement is encountered.

Figure 14:
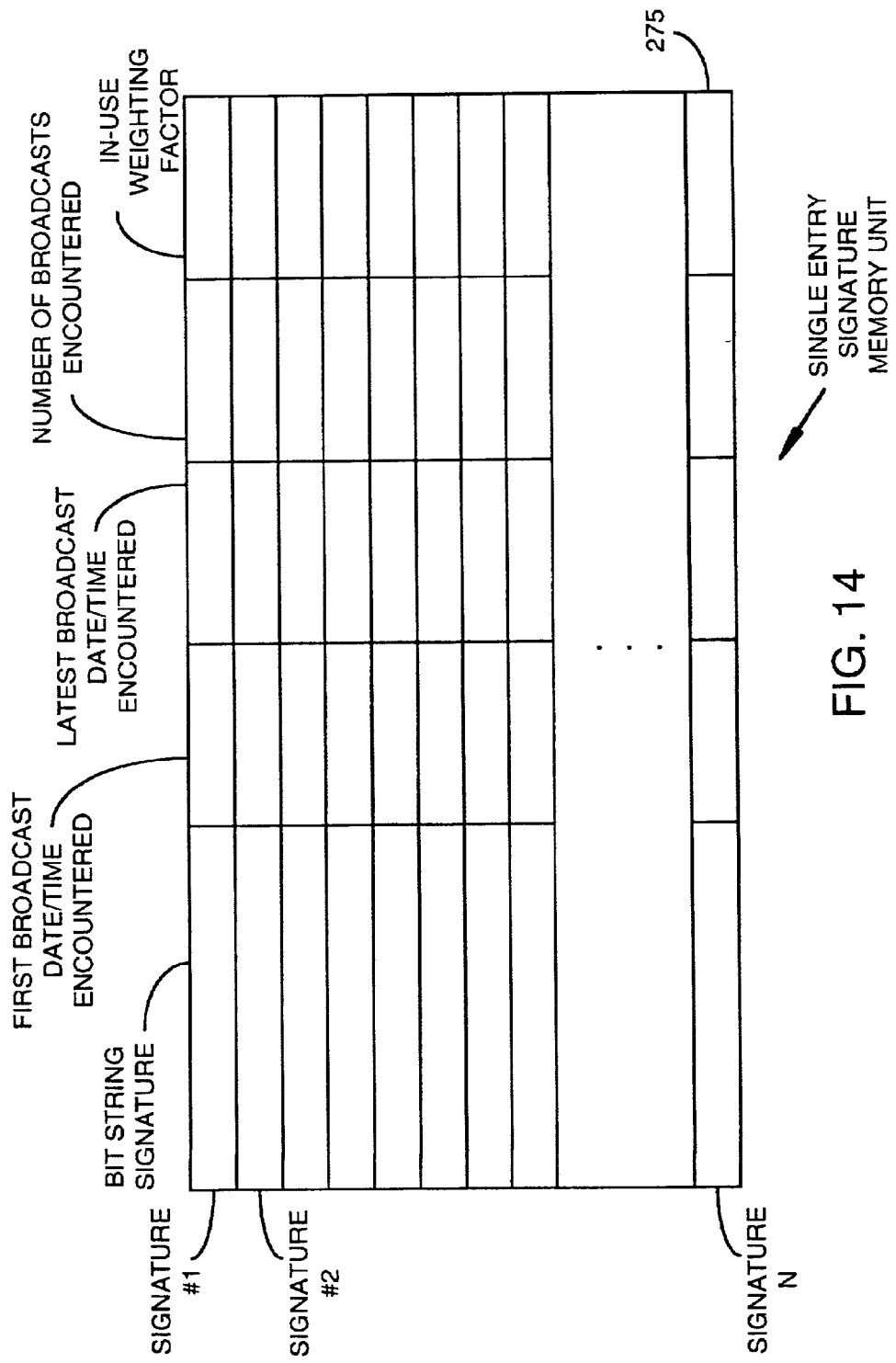
FIG. 14 is a representation of a signature database accessed during execution of the steps of FIG. 13 wherein the database is configured as a RAM storing a single record of information, including broadcast date/time information, for each unique commercial advertisement signature to thereby allow records to be selectively overwritten as needed based, for example, upon the broadcast date/time information.

FIG. 14 sets forth an exemplary database (for use as signature memory unit 128 of FIG. 1) having, for each unique signature stored therein, entries for the first broadcast date/time, the latest broadcast date/time, the number of times the commercial advertisement is encountered and the in-use weighting factor. When the signature entry is initially recorded (step 224 of FIG. 8), the first date/time and the latest date/time are the same, the number of broadcasts is one and the in-use weighting factor is either set to 1 or 0 depending upon whether the television set is currently in use.

Figure 13:
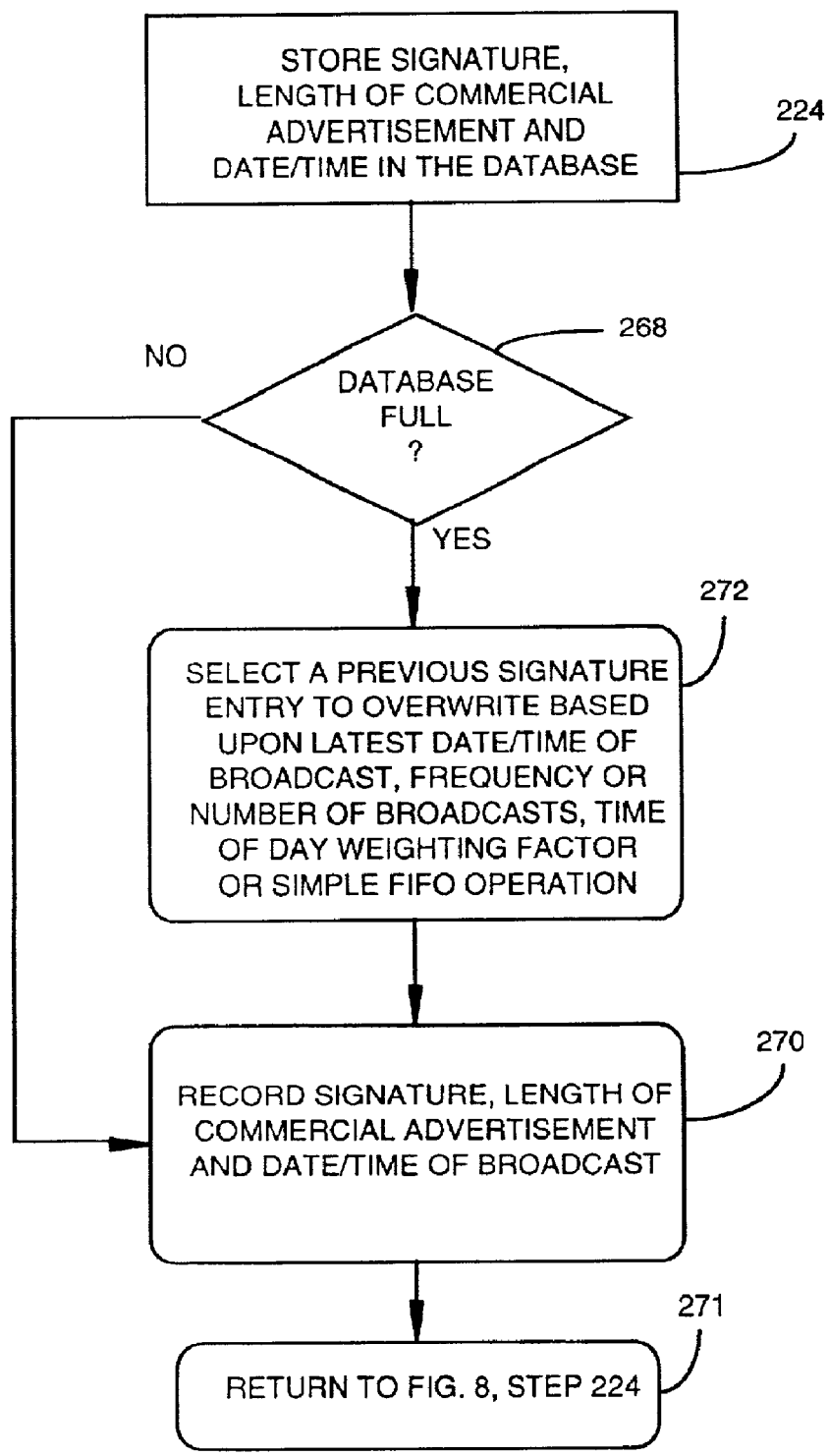
FIG. 13 is a flowchart illustrating steps performed in furtherance of the method of FIG. 8 to store a signature in the database after it has been determined that the signature corresponds to a commercial advertisement segment.

Within FIG. 13, if the database is found to be full at step 268 then step 272 is performed wherein the system selects one of the previously stored records in the database to be overwritten based upon, for example, the latest date/time that the previous signatures were encountered, the first date/time the signatures were encountered, etc. For example, depending upon system pre-programming, the system may overwrite whichever entry was least recently written to the database as indicated by the latest date/time of broadcast information. This technique has the advantage of overwriting signatures corresponding to commercial advertisements not encountered recently and thereby keeping the database up to date. If such is the case, no further information need be recorded along with the signature other than the latest date/time which must be updated upon each detection of the signature (see step 230 of FIG. 8). As another example, the system may overwrite whichever signature record has the lowest frequency of occurrence. In such a case, the system calculates a frequency of occurrence based upon the first date/time of entry, the latest date/time of entry and the number of broadcasts encountered. This technique has the advantage of overwriting signatures not frequently encountered even though the signature may have been recently encountered.

As another example, the system may overwrite whichever signature simply has the least number of encountered broadcasts as represented by the number of broadcasts counter. To ensure that newly stored signatures are not immediately overwritten, the system may also look at the earliest time of broadcast and overwrite a signature only if it was recorded some minimum amount of time earlier.

If the system is configured to search for commercial advertisements even while the television set is not otherwise in use, the system may be configured to overwrite signatures encountered during times that the television was not otherwise in use first before overwriting signatures encountered while the television set was in use. This has the advantage of eliminating signatures that correspond to commercial advertisements not ordinarily encountered while the viewer of the television set typically watches television. In this regard, whenever a signature is first encountered, the system simply determines whether the television set is on and if so, sets the in-use bit to 1 if the set is on and 0 otherwise. Thereafter, if the signature is encountered while the in-use bit is set to 0 and while the television set is on, the in-use bit is re-set to 1. Once the in-use bit is set to 1 it is not reset to 0 until the record is erased. Hence, the in-use bit indicates whether the signature has been encountered at least once while the television set was on. In any case, if a signature record needs to be overwritten, records having in-use bits set to 0 are overwritten first before any records having in-use bits is set to 1.

Figure 15:
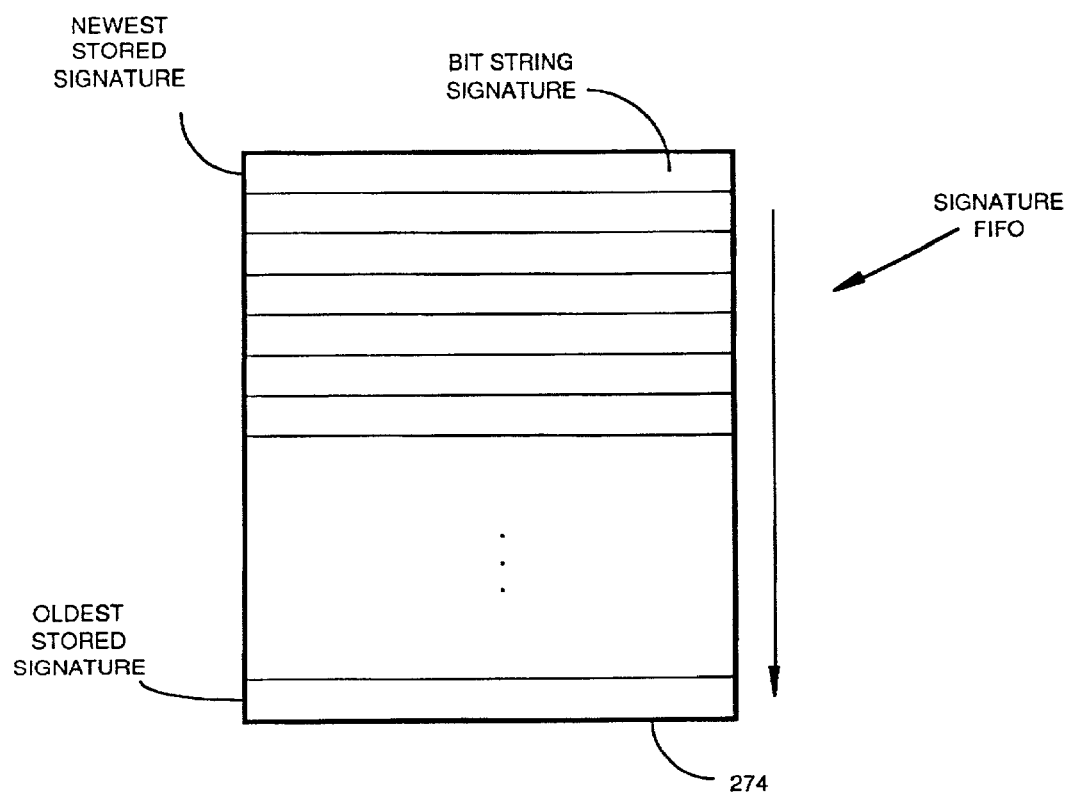
FIG. 15 is a diagram similar to that of FIG. 14 but wherein the database is configured as a first-in first-out (FIFO) queue.

In yet another example, the system may overwrite whichever entry was first written to the database as indicated by the first date/time of broadcast information. If such is the case, the memory is preferably implemented, as illustrated in FIG. 15, as a FIFO 274 such that no explicit date/time value need be stored. If implemented as set forth in FIG. 14, the memory is preferably a RAM.

As noted above, in one implementation the system is configured to operate in a background mode to detect commercial advertisements and record the corresponding signatures even while the television set is not otherwise in use. This is provided in part to allow the system to quickly build a database of commercial advertisement signatures such that, when the television set is in use, there is a higher probability that commercial advertisements encountered will be muted. The background mode is particularly advantageous for use when the system is initially activated with few, if any, pre-stored signatures.

Figure 16:
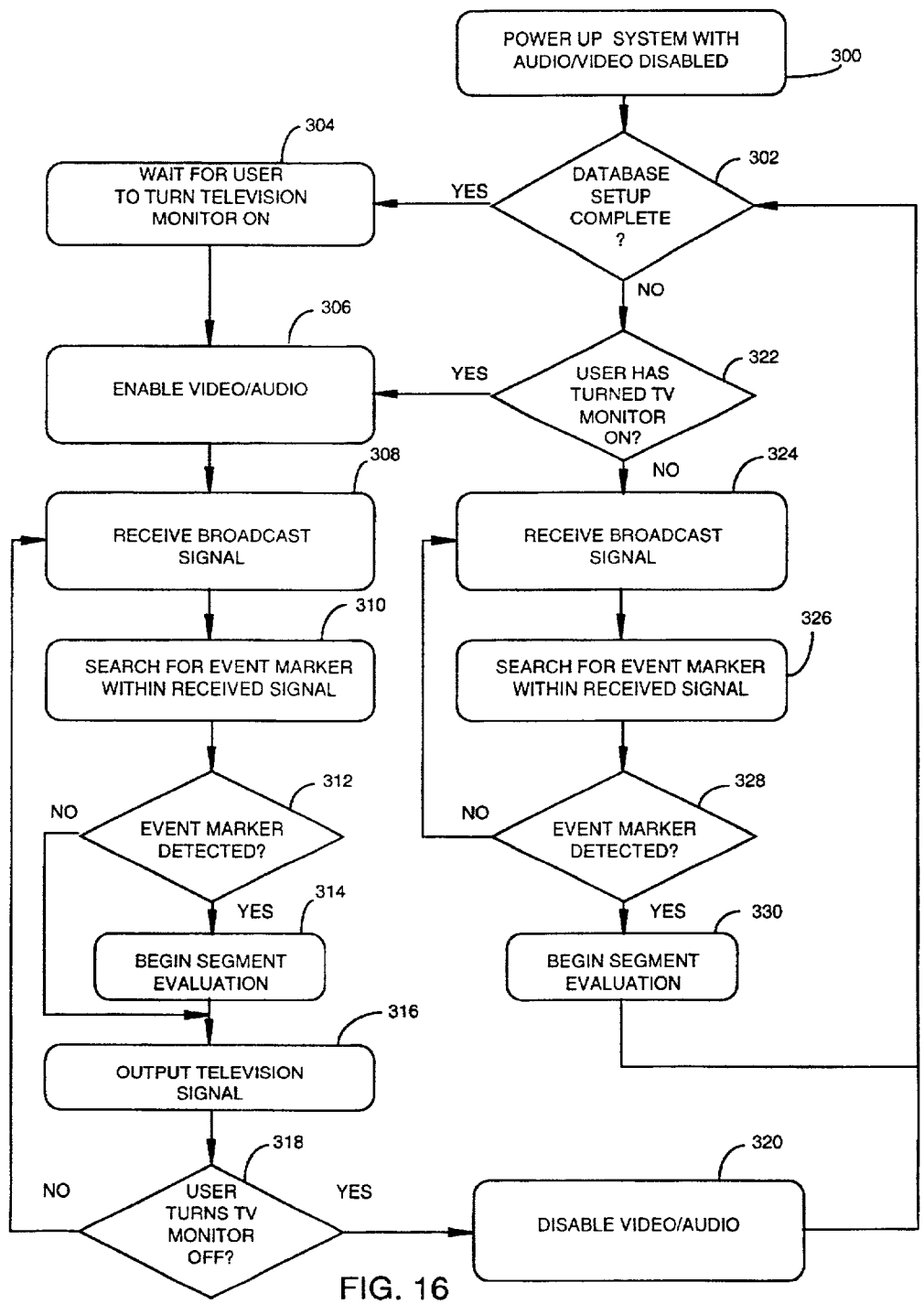
FIG. 16 is a flowchart illustrating a method for operating the system of FIG. 1 wherein the system is operated even while the television set is otherwise not in use to thereby detect and store commercial advertisement segment signatures in a background mode to thereby quickly develop a full database of signatures.

FIG. 16 sets forth a method for implementing the background mode. Initially, at step 300, commercial detecting and muting system 108 (FIG. 1) is powered-up with audio and video outputs to television monitor 104 (also FIG. 1) disabled. At step 302, the database is examined to determine whether it is complete. Depending upon pre-programming, the database may be regarded as being complete if it is full or perhaps if it holds some threshold number of signature records. Assuming that the database is complete, then step 304 is performed where the system waits for user input to turn the television monitor on. Hence, no background processing is initiated. Once the monitor is activated, the audio and video are enabled, step 306, and the system begins receiving a broadcast signal, step 308. As with the basic method of FIG. 8, the system searches for event markers, step 310, and if event markers are detected, step 312, the system begins a broadcast segment evaluation process to determine whether the broadcast segment is a commercial advertisement, step 314. Details of the broadcast segment evaluation process are set forth in FIGS. 8–15 and have been described above. Then, regardless of whether an event marker has been detected or not, step 316 is performed to output the received broadcast signals to the monitor. Since audio and video had previously been enabled, the broadcast signal is thereby displayed by the television monitor, although perhaps muted if currently displaying a detected commercial advertisement. At step 318, the system determines whether the user has deactivated the television monitor and, if not, steps 308–318 are again performed. In this manner, steps 308–318 are repeated in a loop until the television monitor is turned off—at which time step 320 is performed to again disable audio and video. At step 302, the database is again examined to determine if it is still complete and if so the system waits at step 304 until the user again activates the television monitor. Step 302 is performed following step 320 because, in some implementations, the user is provided with the capability of clearing all or a part of the commercial advertisement signature database while operating the television set. Hence, the commercial advertisement database may no longer be complete.

If at step 302, the database is not complete, either because the system is newly installed and has not yet built up a complete database or because the user has cleared the database, execution proceeds to step 322 where the system determines whether the user has activated the television monitor and if so execution proceeds to step 306 and following for non-background commercial advertisement detection processing as already described. If the user has activated the television monitor, execution instead proceeds immediately to step 324 where background processing begins. (It should be noted that step 322 differs from step 304 where the system waits for the user to activate the television monitor. With step 322, the system does not wait for the user to activate the television monitor but immediately triggers either background or non-background processing.)

Background processing begins at step 324 wherein broadcast signals are received. As with the basic method of FIG. 8, the system searches for event markers, step 326, and if event markers are detected, step 328, the system begins a broadcast segment evaluation process to determine whether the broadcast segment is a commercial advertisement, step 330. Details of the broadcast segment evaluation process are set forth in FIGS. 8–16 and have been described above. Then, regardless of whether an event marker has been detected or not, execution returns to step 302 to again evaluate whether the database is complete. It should be noted that in the background processing loop of steps 302–330, there is no step of outputting the broadcast signal. Since audio and video had previously been disabled, no output signal is needed.

If the database remains incomplete and the television monitor remains deactivated, the background processing mode of steps 302–330 is performed in a loop to build a signature database. In this regard, every time a broadcast segment evaluation process is triggered at step 328 which detects a commercial advertisement, the signature for the advertisement is added to the database in the manner described above with reference to FIGS. 8–15. The background processing loop ends either when the database becomes complete (at which time the system waits at step 304 for user input to activate the television monitor) or when the user activates the television monitor at step 322 even though the database is not yet complete. In either case, non-background processing is then performed.

Thus FIG. 16 sets forth a method for operating the system in a background mode to build a signature database even while the television set is not otherwise in use and further sets forth a technique for determining whether background or non-background processing should be performed based upon the completion state of the database and upon whether the user activates the television monitor. In other implementations, rather than detect whether the database is full and activate the background processing mode if it is not full and the user has not activated the monitor, the system merely operates in background mode for some predetermined period of time after the initial system power up (unless the user has activated the monitor). The pre-determined period of time may be, for example, two weeks.

As noted, a system employing the above-described techniques may be implemented either as a plug-in module or as an external device. If a plug-in module, the module is interconnected between an output of a tuner portion of the television set and an input to an audio/video display portion of the television set to output selectively muted or otherwise altered audio and video signals. If external, the system may be connected to video and audio output jacks of a television set for receiving a television signal therefrom. The system includes an infrared mute signal transmitter for transmitting a mute signal to an infrared signal receiver of the television set. Further details of an external system having an infrared transmitter are provided below in connection with FIG. 19 which illustrates an external system for use in controlling a VCR using an infrared transmitter.

Video Recorder/Player Embodiments

Figure 17:
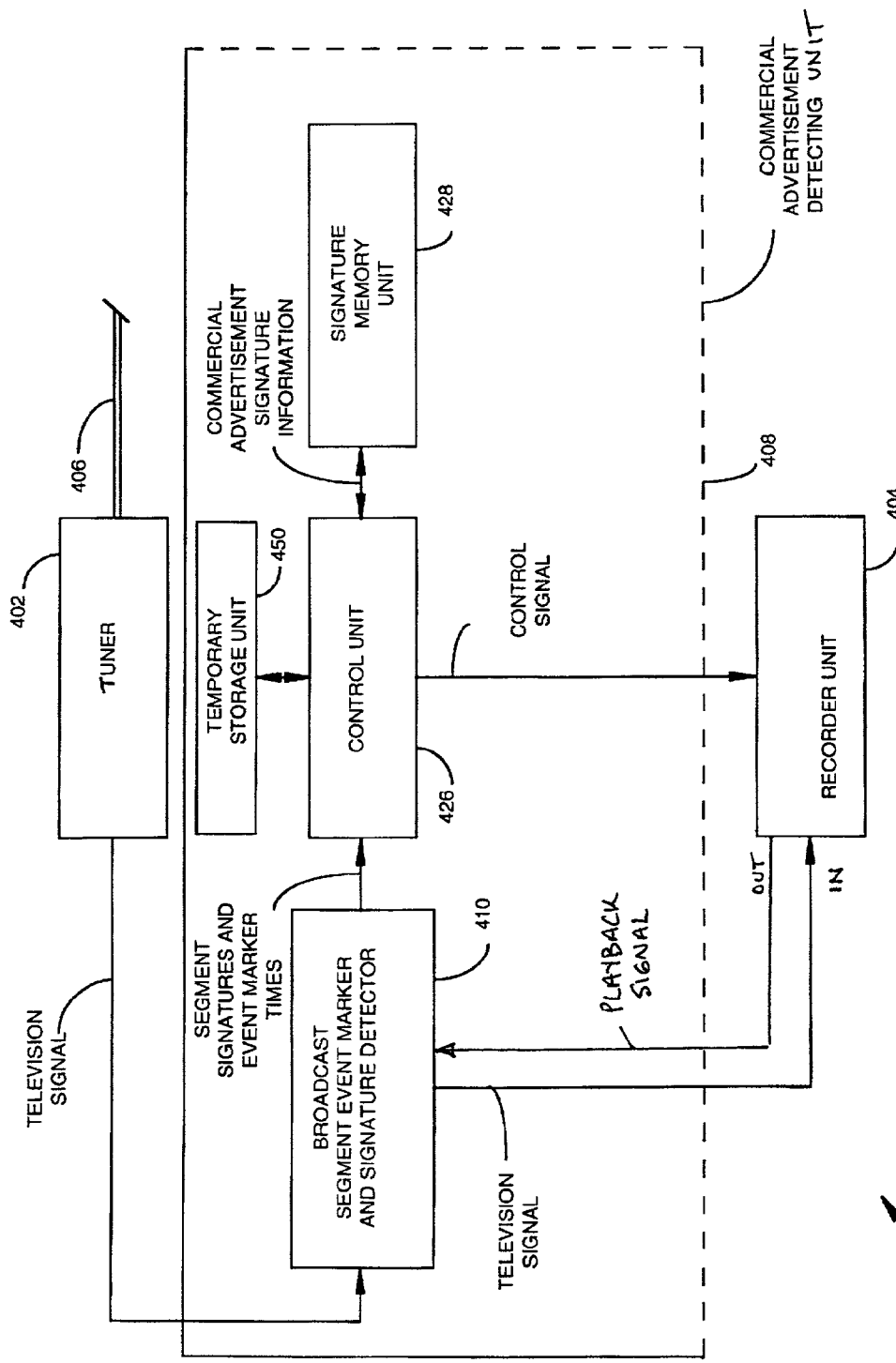
FIG. 17 is a block diagram illustrating a video recording and playback device incorporating a commercial advertisement detection and recording pause system configured in accordance with a second exemplary embodiment of the invention.

With reference to the remaining figures, exemplary embodiments of the invention combined with a video recording and playback device will now be described. Referring first to FIG. 17, a video recorder/player shown generally as 400 is provided with a commercial advertisement detecting unit 408. The video recorder/player may be a conventional VCR, a digital video recorder (DVR), which is also sometimes referred to as a personal video recorder (PVR), or any other device that is capable of recording a video signal and subsequently playing back the recorded signal for viewing. The system of FIG. 17 is similar to the system of FIG. 1 and like components are identified by corresponding reference numerals beginning with reference numeral 400. Only pertinent differences between the embodiment of FIG. 17 and the television set embodiment of FIG. 1 will be described in detail.

Video recorder/player 400 includes a tuner 402 connected to an input coaxial cable 406 or other input source, a recording and playback unit 404 (referred to for convenience as simply a "recorder") and a commercial advertisement detecting and control unit 408 interconnected between the tuner and the recorder. Control unit 408 receives a television signal from tuner 402, detects selected broadcast segments such as commercial advertisements in the same manner as described above with reference to the television set embodiments, and controls recorder 404. The control unit may be configured to pause the recorder during recording of the selected segments to cause the recorder to skip past selected segments during playback or to mute selected segments during playback (as in the TV embodiments). Pausing, skipping or muting may, depending upon the implementation, be performed only during each detected commercial advertisement, during an entire group of commercial advertisements or during any other selected broadcast segments. By employing both individual signature-based advertisement detection and group-based advertisement detection, as described above with reference to FIGS. 1–16, the only commercial advertisements typically recorded or played by recorder 404 are those which do not have a signature already stored in memory unit 428 and which are either the first advertisement of a group or appear late in a group after a pre-determined group minimum time period (of perhaps two minutes twenty seconds) has elapsed. Hence, assuming that a fairly thorough database of signatures has been stored in memory unit 428, a recorded program may be viewed later with few, if any, interruptions.

As with the television set embodiment, the commercial advertisement detection system of the video recorder/player embodiment may be configured to operate even while the device is otherwise not in use to build a database of segment signatures quickly. This is implemented for a video recorder/player in much the same manner as described above with reference to FIG. 16. Details regarding the various components of FIG. 17 may be found above in connection with the description the corresponding components of the television set embodiment of FIG. 1.

Figure 18:
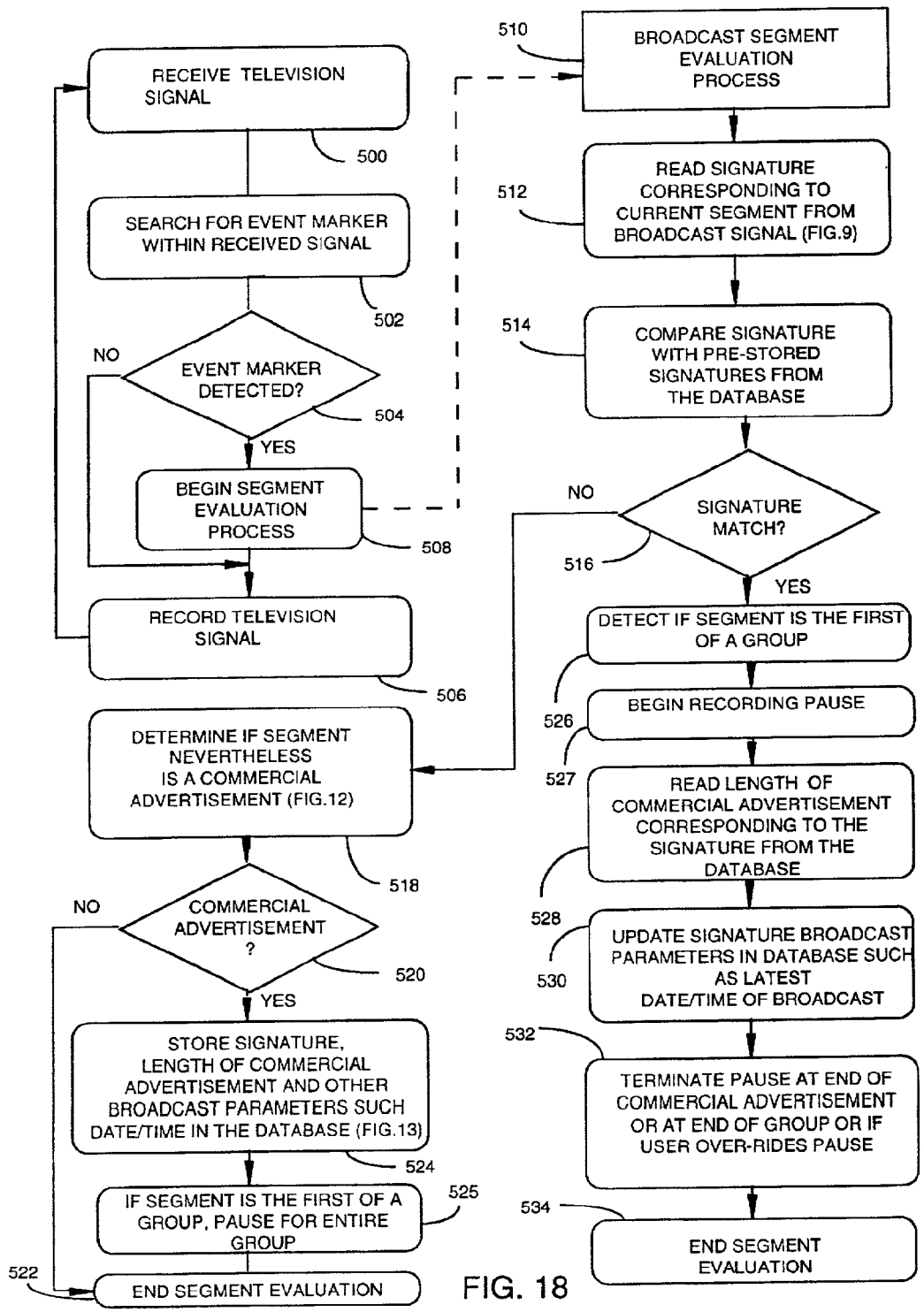
FIG. 18 is a flowchart illustrating an exemplary method performed by the system of FIG. 17.

FIG. 18 illustrates a method performed by the video recorder/player of FIG. 17 for detecting and evaluating broadcast segments and for selectively triggering a recording pause. A similar method for selectively triggering the recorder/player to skip broadcast segments during playback of a recorded program will be described later. The method of FIG. 18 is similar to the method of FIG. 8 and like steps are identified by like reference numerals beginning with reference numeral 500. Only pertinent differences will be described in detail. At step 500, the method operates to receive a television signal via the tuner of the video recorder/player (element 402 of FIG. 17). At step 506, the television signal is recorded on the recorder unit of the VCR (element 404 of FIG. 17). Unlike the corresponding television signal outputting step of FIG. 8 (step 206) which outputs a signal regardless of whether the signal is muted or not, step 506 is performed only if the recorder has not already been paused, as triggered by steps beginning at broadcast segment evaluation process step 510. A pause for an entire commercial advertisement group occurs at step 525 and is terminated either at the end of the pre-determined minimum group time period described above or if a user over-ride occurs. A pause is also triggered at step 527 and is terminated at step 532 at the end of a single commercial advertisement or a group of advertisements or upon a user over-ride. The operation of these and other steps of the method of FIG. 18 are readily understandable based upon the descriptions of the operation of the corresponding method steps of FIG. 8 and therefore will not be described further.

Figure 19:
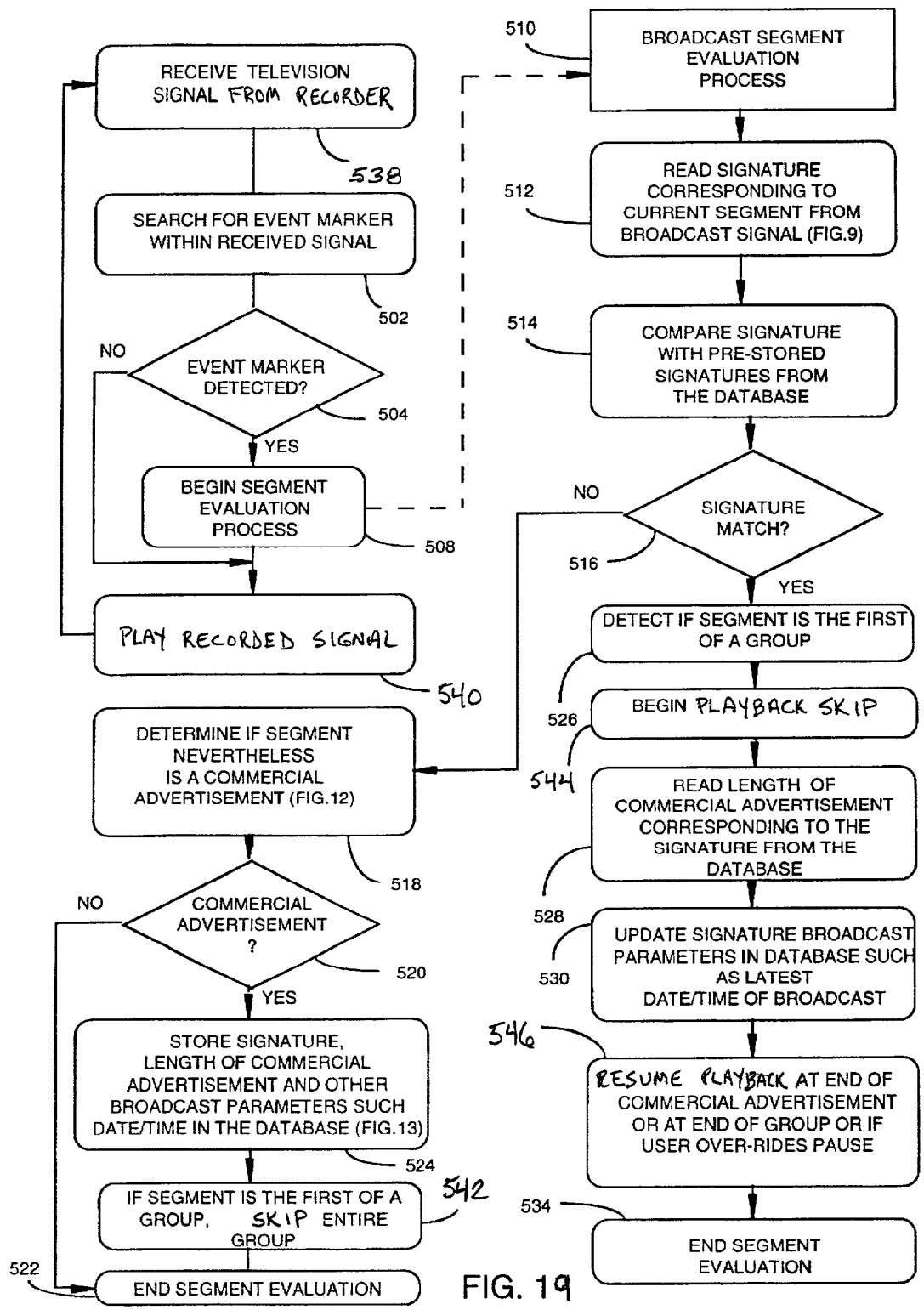
FIG. 19 is a flowchart illustrating another exemplary method performed by the system of FIG. 17.

FIG. 19 illustrates another method, generally similar to that of FIG. 18, wherein the video recorder/player is controlled to skip selected broadcast segments during playback rather than pause during recording. Only those steps that differ from the previously described method are identified with different reference numerals. In each of steps 542 and 544, the recorder/player is commanded to skip past the unwanted segments rather than pause. Otherwise, the processing of event markers and signatures is the same as previously discussed. In a further embodiment, the audio and video signals from the recorder/player may be muted during the unwanted segments as in the television set embodiments.

Figure 20:
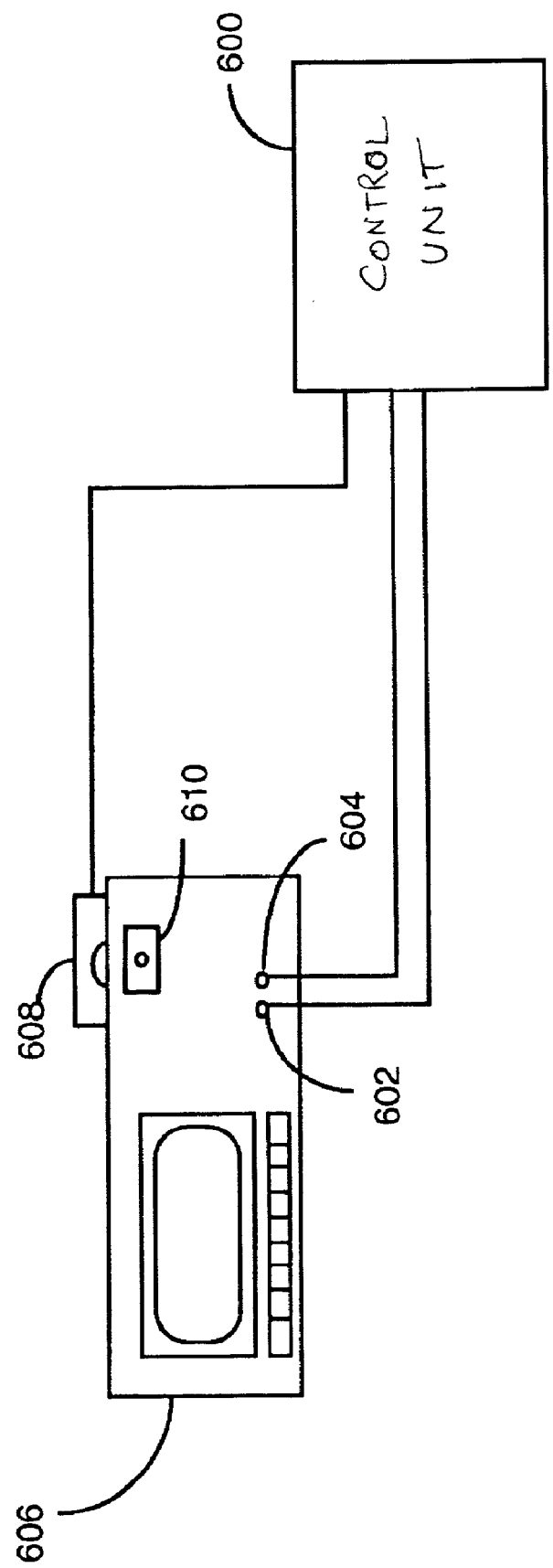
FIG. 20 illustrates a system wherein an apparatus performing the method of FIG. 18 is provided external to a video recording and playback device.

As with the television embodiment, a system employing the above-described techniques may be implemented either as hardware and/or software installed within a video recorder/player or as an external device. If external, the system may be interconnected to a video recorder/player as shown in FIG. 20. A selective recording pause and/or playback skip unit 600 is connected to audio 602 and video 604 output jacks of a video recorder/player 606. The audio and video output jacks are connected internally to a tuner portion (not separately shown). Unit 600 receives the audio and video signals from the audio and video output jacks and determines, using the techniques described above, when to initiate and terminate muting. An infrared transmitter 608 receives an electrical signal from unit 600 and outputs an infrared signal to an infrared input 610 of the video recorder/player. The infrared signal is set to emulate the infrared signal normally received by the video recorder/player from an infrared remote control unit (not separately shown) when a user presses a pause (during recording) or fast forward (during playback) button on the remote control. In this manner, during a recording mode, the recording is paused during detected commercial advertisements or other unwanted broadcast material as described above, while in a playback mode, the commercial advertisements or other unwanted broadcast material are automatically skipped.

What has been described are methods and apparatus for detecting commercial advertisements in real-time by comparing signatures of received broadcast segments with a database of stored signatures corresponding to known commercial advertisements. Segments having a signature matching any of the stored signatures may be muted, omitted from a recording or skipped during playback. For segments having signatures not found in the database, the system may nevertheless determine whether the segment is a commercial advertisement and, if so, add the signature to the database. This latter determination may be based upon known characteristics of commercial advertisements. In one exemplary embodiment, the determination is based upon the assumption that commercial advertisements are always preceded and followed by black frame/low audio event markers and are always 15, 30 or 60 seconds in length. This appears to be a fairly universal rule at least with television signals broadcast in the United States. However, if employed in connection with a television broadcast system wherein commercial advertisements are typically of different lengths, the system of the invention may be pre-programmed with those different lengths. In other implementations, other appropriate rules or characteristics of commercial advertisements or other selected segments may employed either additionally or alternatively for distinguishing the selected segments from other broadcast segments.

In general, almost any set of rules or characteristics of broadcast signals that serve to distinguish commercial advertisements or other selected segments from program segments may be employed to determine whether or not a broadcast segment, for which there is no signature match, is nevertheless a commercial advertisement. The rules are merely programmed or otherwise incorporated within system 108 of FIG. 1 to detect commercial advertisements and an appropriate signature or other distinguishing feature is stored for application against future received broadcast signals. Indeed, suitable rules may be applied to detect almost any desired selected segment within a television broadcast signal and not necessarily just commercial advertisements.

Although described with reference to exemplary systems which operate to mute a television signal, suspend recording during commercial advertisements, or skip commercial advertisements during playback, almost any other desired action may alternatively be triggered. For example, the television system embodiment may completely cut off the broadcast video and audio feed and replace the video feed with, for example, a screen presenting an appropriate logo representative of the commercial determination system such as the tradename or trademark of the system. As another example, the television system embodiment may change the reception channel upon detection of a commercial advertisement then return to the same channel upon completion of the advertisement or group of advertisements. Such requires a two-tuner system, which is common for television sets with picture-in-picture capability. Also, as described above, the system may merely record the date and time of each commercial advertisement for broadcast verification purposes. As can be appreciated, a wide range of alternative implementations are available consistent with the general principles of the invention.

The preceding description of exemplary embodiments is provided to enable any person skilled in the art to make or use the invention. It should be appreciated that not all components necessary for a complete implementation of a practical system are illustrated or described in detail. Rather, only those components necessary for a thorough understanding of the invention have been illustrated and described. Furthermore, it should be understood that the exemplary embodiments of the invention described herein are merely illustrative of general principles of the invention which can be applied to other applications, to achieve other ends, and to remedy other problems not specified herein. Accordingly, the scope of the invention should not be limited to the exemplary embodiments described herein.

What is claimed is:

1. A method of controlling a television signal playback unit comprising:
    playing a recorded television signal in a television signal playback unit;
    detecting a first event in the television signal;
    capturing a signature pattern associated with a first segment of the television signal following the first event;
    comparing the captured signature pattern to stored signature patterns;
    if the captured signature pattern matches one of the stored signature patterns, controlling the television signal playback unit to skip the first segment of the television signal;
    if the captured signature pattern does not match any of the stored signature patterns, storing the captured signature pattern in a temporary storage location;
    adding the captured signature pattern to the stored signature patterns if a second event in the television signal is detected within a predetermined window of time following the first event.

2. The method of claim 1 wherein the television signal playback unit is combined with a television signal recording unit.

3. The method of claim 2 wherein the combined television signal recording and playback unit comprises a digital recording medium.

4. The method of claim 1 wherein at least some of the stored signature patterns are stored in response to a user request.

5. A method of controlling a television signal playback unit comprising:
    playing a recorded television signal in a television signal playback unit;
    detecting a first event in the television signal;
    capturing a signature pattern associated with a first segment of the television signal following the first event;
    comparing the captured signature pattern to stored signature patterns;
    if the captured signature pattern matches one of the stored signature patterns, controlling the television signal playback unit to skip the first segment of the television signal;
    if the captured signature pattern does not match any of the stored signature patterns, storing the captured signature pattern in a temporary storage location;
    monitoring a signal receiver for a user input signal;
    adding the captured signature pattern to the stored signature patterns if the user input signal is received prior to detection of a next event in the television signal.

* * * * *